United States Patent
Yang et al.

(10) Patent No.: US 12,003,958 B2
(45) Date of Patent: Jun. 4, 2024

(54) ELECTRONIC DEVICE FOR PERFORMING AUTHENTICATION BY USING ACCESSORY, AND ELECTRONIC DEVICE OPERATING METHOD

(71) Applicant: Samsung Electronics Co., Ltd., Gyeonggi-do (KR)

(72) Inventors: Yi Yang, Gyeonggi-do (KR); Jonghwan Kim, Gyeonggi-do (KR); Jaehyung Seo, Gyeonggi-do (KR); Jiho Shin, Gyeonggi-do (KR); Jonghoon Jang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 36 days.

(21) Appl. No.: 17/267,830

(22) PCT Filed: May 17, 2019

(86) PCT No.: PCT/KR2019/005962
§ 371 (c)(1),
(2) Date: Feb. 11, 2021

(87) PCT Pub. No.: WO2020/054942
PCT Pub. Date: Mar. 19, 2020

(65) Prior Publication Data
US 2021/0195415 A1    Jun. 24, 2021

(30) Foreign Application Priority Data
Sep. 14, 2018 (KR) .................. 10-2018-0110078

(51) Int. Cl.
*H04W 12/06* (2021.01)
*G06F 21/35* (2013.01)
*H04W 12/63* (2021.01)

(52) U.S. Cl.
CPC ............ *H04W 12/06* (2013.01); *G06F 21/35* (2013.01); *H04W 12/63* (2021.01)

(58) Field of Classification Search
CPC ..... H04W 12/06; H04W 12/63; H04W 4/023; H04W 4/029; H04W 4/80; G06F 21/35;
(Continued)

(56) References Cited

U.S. PATENT DOCUMENTS 8,886,849 B2 * 11/2014 Golembeski ........ G06F 13/4221
710/5
9,472,075 B1    10/2016 Simon et al.
(Continued)

FOREIGN PATENT DOCUMENTS

JP     2007251557 A  *  9/2007
KR   10-2015-0002954 A    1/2015
(Continued)

OTHER PUBLICATIONS

Korean Office Action dated Oct. 19, 2022.
Korean Decision of Patent dated Apr. 25, 2023.

*Primary Examiner* — Meng Li
*Assistant Examiner* — Lydia L Noel
(74) *Attorney, Agent, or Firm* — Cha & Reiter, LLC

(57) ABSTRACT

An electronic device and an electronic device operating method according to various embodiments comprises: a processor operationally connected to the first communication module, the second communication module, and the security module, wherein the processor can be configured to control the second communication module such that the second communication module activates the accessory in response to the reception, through the first communication scheme, of a discovery signal broadcasted by the external electronic device, control the second communication module such that the second communication module transmits, to the accessory through the third communication scheme, (Continued)

the data to be used for authentication with the external electronic device, and control the accessory such that the accessory transmits, to the external electronic device through the second communication scheme, the data to be used for authentication with the external electronic device.

4 Claims, 18 Drawing Sheets

(58) Field of Classification Search
CPC ..... G06F 21/32; G06F 21/45; H04L 63/0853; H04L 63/18
See application file for complete search history.

(56) References Cited

U.S. PATENT DOCUMENTS

| | | | | |
|---|---|---|---|---|
| 9,571,974 B2 * | 2/2017 | Choi | ........................ | H04W 4/80 |
| 9,730,268 B2 * | 8/2017 | Bolton | ................... | H04W 8/005 |
| 9,911,259 B1 | 3/2018 | Ghabra et al. | | |
| 2014/0330449 A1 | 11/2014 | Oman et al. | | |
| 2015/0244665 A1 * | 8/2015 | Choi | ..................... | H04L 51/224 |
| | | | | 709/206 |
| 2015/0337587 A1 * | 11/2015 | Lu | ...................... | G06Q 10/1095 |
| | | | | 701/49 |
| 2017/0041856 A1 | 2/2017 | Kim et al. | | |
| 2017/0244823 A1 | 8/2017 | Kim et al. | | |
| 2017/0249791 A1 * | 8/2017 | Woo | ........................ | G07C 9/28 |
| 2018/0032291 A1 * | 2/2018 | Goto | ..................... | H04W 76/10 |
| 2018/0162321 A1 | 6/2018 | Spiess | | |
| 2018/0245559 A1 * | 8/2018 | Kang | ................... | G07C 9/00944 |
| 2018/0279158 A1 * | 9/2018 | Choi | ..................... | H04W 88/04 |
| 2019/0072661 A1 | 3/2019 | Jeon et al. | | |

FOREIGN PATENT DOCUMENTS

| | | | |
|---|---|---|---|
| KR | 2015-0002954 A | * | 1/2015 |
| KR | 20160077830 A | * | 7/2016 |
| KR | 10-2017-0016693 A | | 2/2017 |
| KR | 10-1766901 B1 | | 8/2017 |
| KR | 10-2017-0105827 A | | 9/2017 |
| KR | 10-2018-0026447 A | | 3/2018 |
| KR | 10-2018-0028201 A | | 3/2018 |
| KR | 10-2018-0028204 A | | 3/2018 |
| KR | 2018-0028204 A | * | 3/2018 |
| KR | 10-2018-0098017 A | | 9/2018 |

\* cited by examiner

ELECTRONIC DEVICE FOR PERFORMING AUTHENTICATION BY USING ACCESSORY, AND ELECTRONIC DEVICE OPERATING METHOD

CROSS REFERENCE TO RELATED APPLICATIONS

This application is a National Phase Entry of PCT International Application No. PCT/KR2019/005962, which was filed on May 17, 2019, and claims a priority to Korean Patent Application No. 10-2018-0110078, which was filed on Sep. 14, 2018, the contents of which are incorporated herein by reference.

TECHNICAL FIELD

Various embodiments of the disclosure relate to an electronic device configured to perform authentication by using an accessory, and a method for operating the electronic device.

BACKGROUND ART

A technology for performing authentication with an external electronic device through a smart key that supports wireless communication is being developed. For example, there is ongoing development of a technology regarding a smart key such that, if the external electronic device is a vehicle, the smart key can perform a function that the vehicle may provide, such as unlocking doors of the vehicle, or starting the engine of the vehicle. The smart key may perform an authentication procedure by using short-range communication with the vehicle, and may activate a function of the vehicle (for example, unlocking or starting up) after the authentication is completed.

There has recently appeared a technology developed such that, without using a separate smart key for activating vehicle functions, a portable terminal (for example, a smartphone or a wearable device) carried by a user may be used to provide functions that the vehicle may provide.

Recent vehicle manufacturers may provide a portable terminal with a vehicle key such that the vehicle owner or vehicle sharers can perform various functions, such as opening vehicle doors by using the portable terminal (as if using a normal smart key) or igniting the vehicle engine.

DISCLOSURE OF INVENTION

Technical Problem

A portable terminal may include a security module storing data for authentication with an external electronic device (for example, key of the external electronic device). The portable terminal may transmit data for authentication through communication with the external electronic device, and the external electronic device may authenticate the electronic device by using the data for authentication.

The data for authentication stored in the security module may be transmitted to the external electronic device by using a short-range communication scheme (for example, NFC). The short-range communication scheme has a limited communication range (for example, 10 cm), and the portable terminal can transmit data only if the same is close to the external electronic device. This may cause usability-related restrictions.

If the data for authentication stored in the security module is transmitted by using a wireless communication scheme (for example, Bluetooth or Wi-Fi), the same may be vulnerable to a relay attack (a malicious third party acquires data used for authentication by seizing wireless communication signals).

Solution to Problem

An electronic device according to various embodiments of the disclosure may include: a first communication module configured to communicate with an external electronic device by using a first communication scheme; an accessory configured to communicate with the external electronic device by using a second communication scheme and operatively connected to the electronic device; a second communication module configured to transmit/receive data to/from the accessory by using a third communication scheme; a security module configured to store data used for authentication with the external electronic device; and a processor operatively connected to the first communication module, the second communication module, and the security module. The processor may be configured to: control the second communication module to activate the accessory in response to receiving a discovery signal broadcast by the external electronic device through the first communication scheme; control the second communication module to transmit the data used for authentication with the external electronic device to the accessory through the third communication scheme; and control the accessory to transmit the data used for authentication with the external electronic device to the external electronic device through the second communication scheme.

An operation method of an electronic device according to various embodiments of the disclosure may include: receiving a discovery signal, broadcast by an external electronic device, through a first communication scheme; controlling an accessory, operatively connected to the electronic device, such that the accessory is connected the external electronic device through a second communication scheme, in response to receiving the discovery signal; transmitting data used for authentication with the external electronic device to the accessory through a third communication scheme; and transmitting, by the accessory, the data to the external electronic device through the second communication scheme.

Advantageous Effects of Invention

An electronic device and a method for operating the electronic device, according to various embodiments of the disclosure, enable an external electronic device that performs authentication to determine whether or not to perform authentication to determine whether or not to perform an authentication-related operation, in view of position information of the electronic device, thereby improving security related to authentication operations.

An electronic device and a method for operating the electronic device, according to various embodiments of the disclosure, may acquire position information of the electronic device by using an accurate communication scheme (for example, ultrawide band (UWB)), thereby improving security related to authentication operations.

An electronic device and a method for operating the electronic device, according to various embodiments of the disclosure, may use an accessory that supports a communication scheme by which position information can be precisely measured such that even an electronic device that does not support the communication scheme can perform authentication operations through the communication scheme, thereby expanding the versability.

MODE FOR CARRYING OUT THE INVENTION

Figure 1:
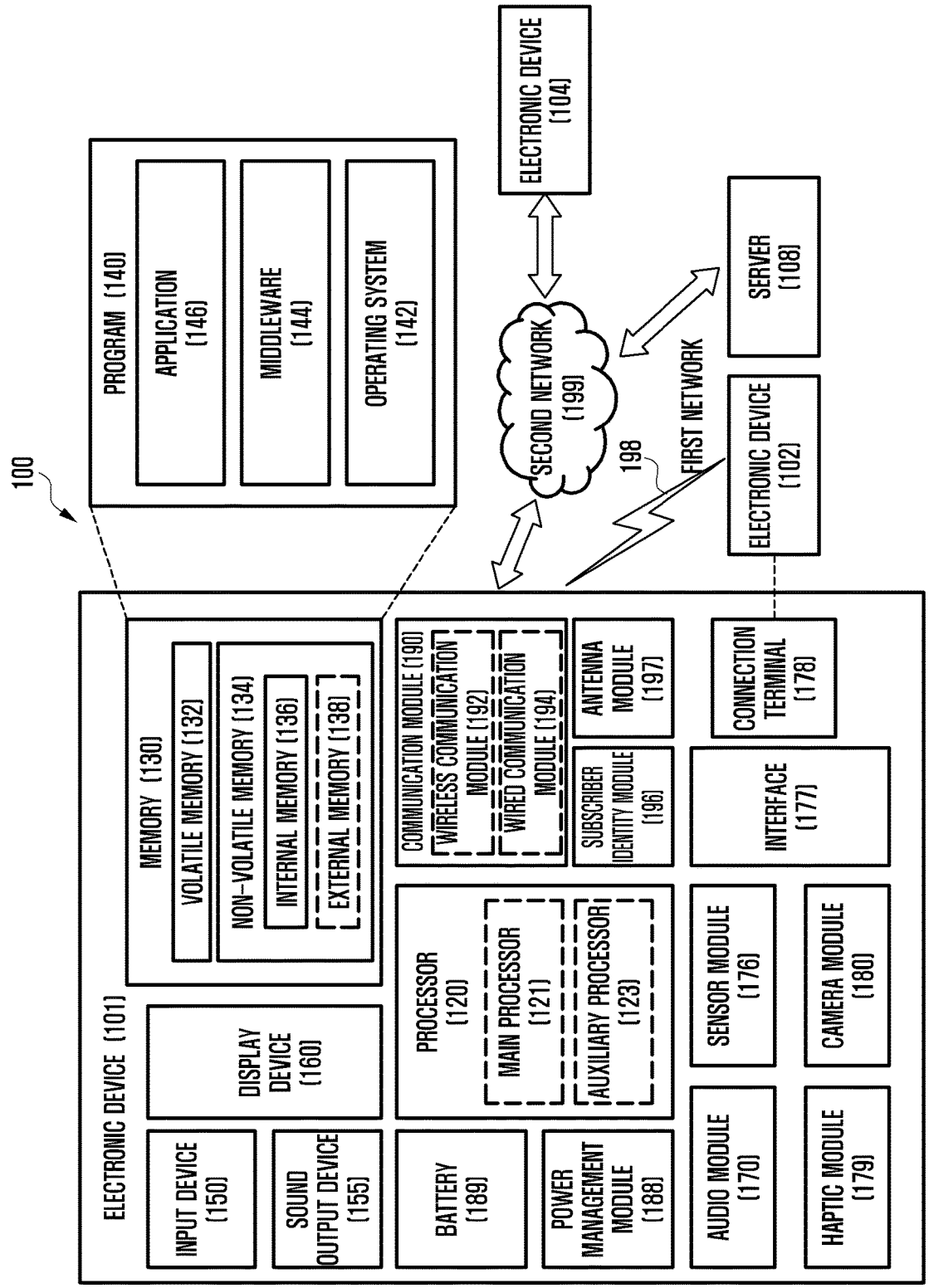
FIG. 1 is a block diagram of an electronic device according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
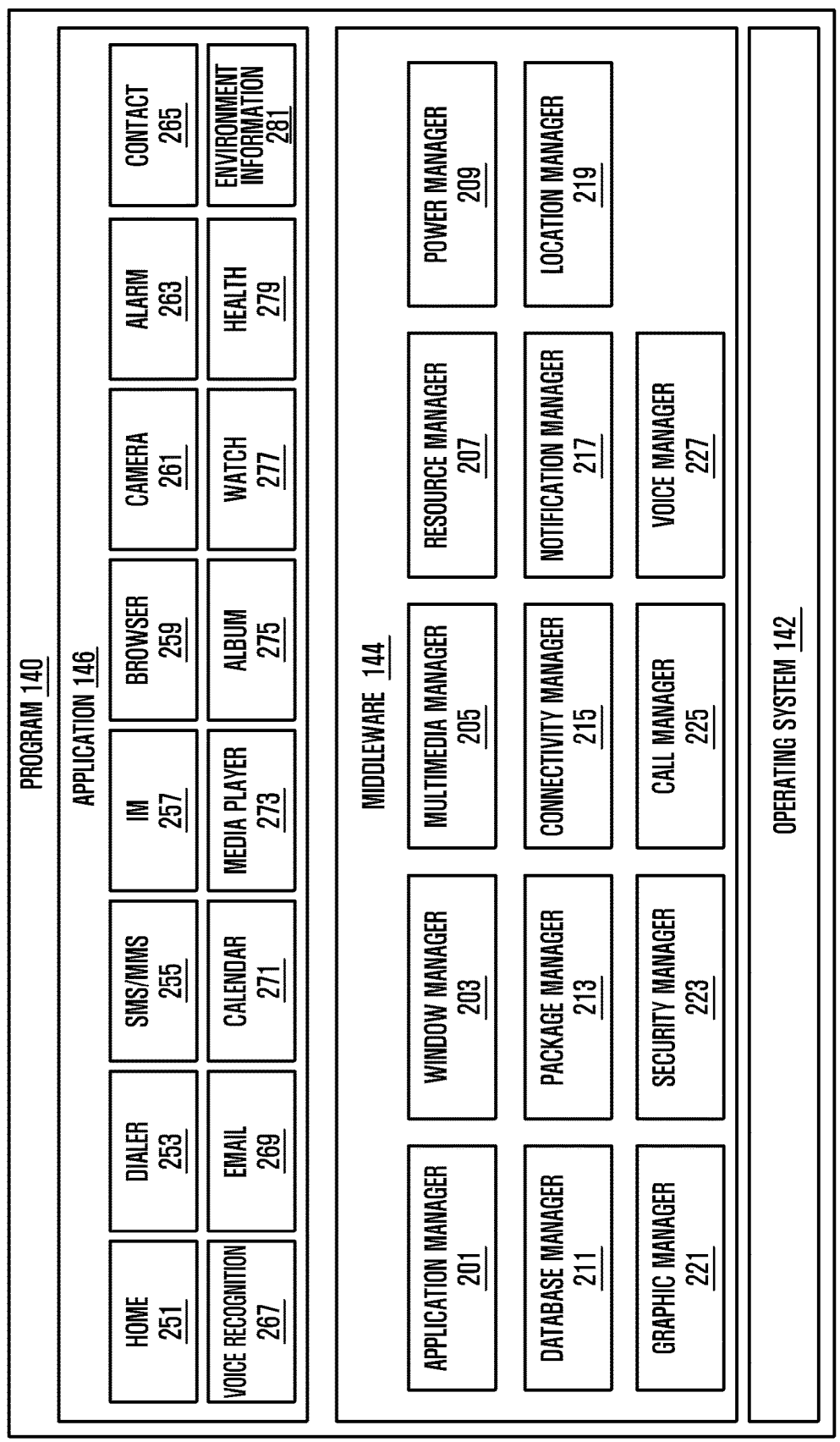
FIG. 2 is a block diagram of a program operating in an electronic device according to various embodiments of the disclosure.

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
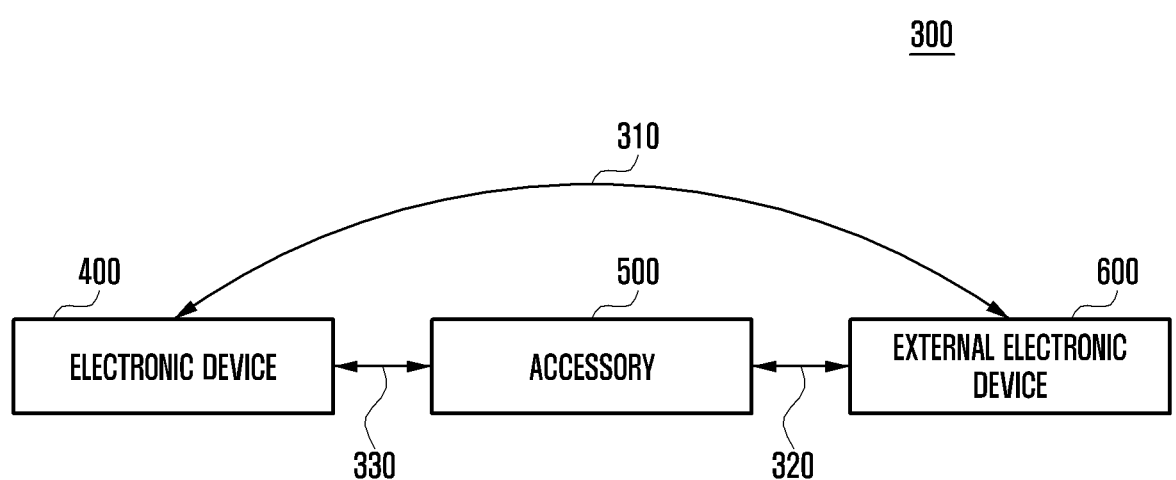
FIG. 3 illustrates data transmission/reception using various communication schemes among an electronic device, an accessory, and an external electronic device according to various embodiments of the disclosure.

FIG. 3 illustrates data transmission/reception using various communication schemes among an electronic device, an accessory, and an external electronic device in a system according to various embodiments of the disclosure.

Referring to FIG. 3, a system 300 according to various embodiments of the disclosure may transmit/receive data by using a first communication scheme 310, a second communication scheme 320, and a third communication scheme 330 among an electronic device 400, an accessory 500, and an external electronic device 600.

According to various embodiments of the disclosure, the electronic device 400 may perform authentication with the external electronic device 600, and the external electronic device 600 may perform an authentication-related operation, based on the authentication result.

According to various embodiments of the disclosure, the first communication scheme 310 may be a communication scheme that can be supported by the electronic device 400. For example, the first communication scheme 310 may be various communication schemes including Bluetooth, low-power Bluetooth (BLE), communication using a cellular network, or Wi-Fi. The electronic device 400 may receive, using the first communication scheme 310, a discovery signal broadcast by the external electronic device 600.

According to various embodiments of the disclosure, the second communication scheme 320 may be a communication scheme which is not supported by the electronic device 400 and can be supported by the external electronic device 600. For example, the second communication scheme 320 may be an ultra-wideband (UWB) communication scheme using a wide frequency band of several GHz (e.g., 3.1 GHz to 10.6 GHz). The external electronic device 600 may transmit/receive data to/from the accessory 500 by using the second communication scheme.

According to various embodiments of the disclosure, the third communication scheme 330 may be a communication scheme used for data transmission/reception between the electronic device 400 and the accessory 500. For example, the third communication scheme 330 may be near-field communication (NFC). The electronic device 400 may transmit/receive data to/from the accessory 500 by using the third communication scheme 330.

According to various embodiments of the disclosure, the electronic device 400 may store data used for authentication with the external electronic device 600. The electronic device 400 may transmit/receive data used for authentication to/from various electronic devices by using the third communication scheme 330, and may perform authentication with the various electronic devices.

According to various embodiments of the disclosure, data used for authentication may be acquired by a malicious third party, and when the malicious third party acquires the data used for authentication, the system 300 may authenticate the external electronic device 600, and the external electronic device 600 may be exposed to a relay attack while performing an operation related to authentication. In order to prevent the relay attack, the external electronic device 600 may perform authentication in consideration of information about the position of the electronic device 400 (e.g., the distance between the external electronic device 600 and the electronic device 400, or the movement direction of the electronic device 400).

According to various embodiments of the disclosure, the external electronic device 600 may perform, based on the position information of the electronic device 400, authentication of the electronic device 400, and may perform, based on the authentication result, an operation related to the authentication. For example, the external electronic device 600 may be a vehicle, and when the electronic device 400 is present within a predetermined distance, the external electronic device 600 may perform authentication for opening and closing the door of the vehicle. According to various embodiments of the disclosure, the first communication scheme 310 may be various communication schemes including Bluetooth, low-power Bluetooth, or Wi-Fi, and the external electronic device 600 may identify position information of the electronic device 400 by using the first communication scheme 310. When the external electronic device 600 identifies the position information of the electronic device 400 by using the first communication scheme 310, the accuracy of the position information may be low. When the second communication scheme 320 is ultra-wideband communication, position information measured using the second communication scheme 320 may be accurate information having an error in the units of centimeters (cm).

According to various embodiments of the disclosure, the electronic device 400 may not include a communication module which supports the second communication scheme 320. In this case, the electronic device 400 may not transmit/receive data to/from the external electronic device 600 by using the second communication scheme 320.

According to various embodiments of the disclosure, the electronic device 400 may transmit/receive data to/from the external electronic device 600 by using the accessory 500 capable of supporting the second communication scheme 320. The accessory 500 may transmit/receive data to/from the external electronic device 500 by using the second communication scheme 320, and may transmit/receive data to/from the electronic device 400 by using the third communication scheme 330.

According to various embodiments of the disclosure, by using the accessory 500 capable of supporting the second communication scheme 320, the electronic device 400 may transmit/receive data to/from the external electronic device 600 by using the second communication scheme 320. The external electronic device 600 may transmit/receive data to/from the electronic device 400 by using the accessory 500 capable of supporting the second communication scheme 320, and may thus precisely measure position information of the electronic device 400. Further, the external electronic device 600 may determine, based on the position information of the electronic device 400, whether to perform authentication, and may thus prevent a relay attack. The external electronic device 600 may identify the position information of the electronic device 400 by using data transmitted/received using the second communication scheme 320.

Figure 4A:
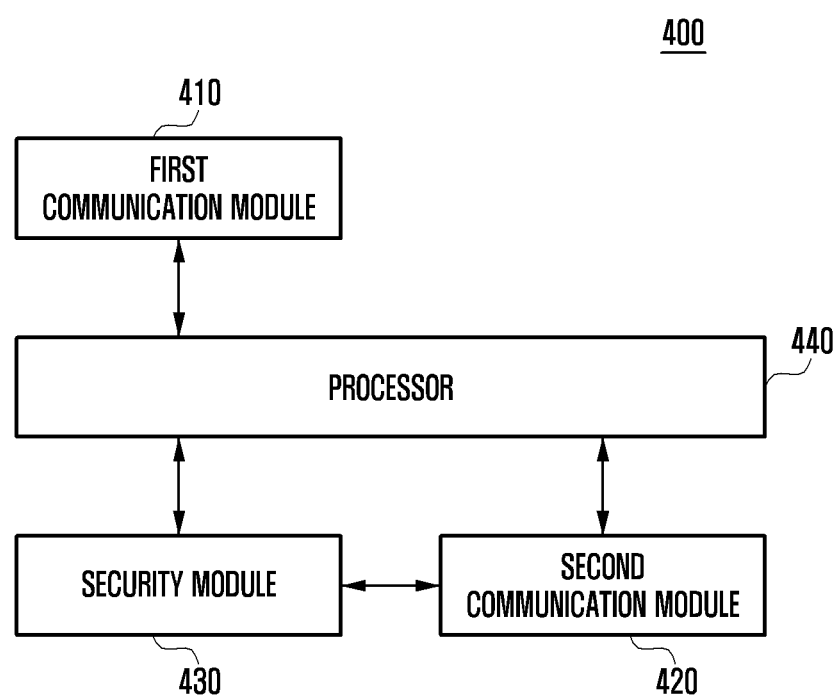
FIG. 4A is a block diagram of an electronic device according to various embodiments of the disclosure.

FIG. 4A is a block diagram of an electronic device according to various embodiments of the disclosure.

Referring to FIG. 4A, an electronic device (e.g., the electronic device 400 in FIG. 3) according to various embodiments of the disclosure may include a first communication module 410, a second communication module 420, a security module 430, and a processor 440.

According to various embodiments of the disclosure, the first communication module 410 may transmit/receive data to/from an external electronic device (e.g., the external electronic device 600 in FIG. 3) by using a first communication scheme (e.g., the first communication scheme 310 in FIG. 3). The first communication scheme 310 may be a communication scheme that can be supported by the electronic device 400. For example, the first communication scheme 310 may be various communication schemes including Bluetooth, low-power Bluetooth (BLE), communication using a cellular network, or Wi-Fi.

According to various embodiments of the disclosure, the second communication module 420 may transmit/receive data to/from an accessory (e.g., the accessory 500 in FIG. 3) by using a third communication scheme (e.g., the third communication scheme 330 in FIG. 3). The third communication scheme 330 may be, for example, near-field communication (NFC). The electronic device 400 may transmit/receive data to/from the accessory 500 by using the third communication scheme 330.

According to various embodiments of the disclosure, the security module 430 may store data used for authentication with the external electronic device 600. The authentication with the external electronic device 600 may be performed in order to use various functions that may be provided by the external electronic device 600.

According to various embodiments of the disclosure, an applet configured to authenticate the external electronic device 600 may be installed and stored in the security module 430. For example, the applet may be a key for using the external electronic device 600. When the external electronic device 600 is a vehicle, the applet installed in the security module 430 may be an applet configured to manage a key which is to be used to authenticate the vehicle. The applet installed in the security module 430 may be provided by a manufacturer of the external electronic device 600. When the external electronic device 600 is a door used to come into and out of a specific space, the applet may be an applet configured to manage a key used for authentication related to opening and closing of the door.

According to various embodiments of the disclosure, authentication of the electronic device 400 may be a procedure of determining whether the electronic device 400 has a valid right to perform various functions that can be provided by the external electronic device 600. According to various embodiments of the disclosure, the external electronic device 600 may be a vehicle or various electronic devices electrically connected in order to control the vehicle.

According to one embodiment of the disclosure, the security module 430 may be a module which is physically separate from the processor 440 or a memory (e.g., the memory 130 in FIG. 1), and data stored in the security module 430 may be encrypted before being stored. According to another embodiment of the disclosure, the security module 430 may be included in one region of the memory 130, and the security module 430 may be a portion of the memory 130, in which data is encrypted and stored.

According to various embodiments of the disclosure, in response to receiving a request to access data stored in the security module 430, the security module 430 may verify integrity or a access right of a subject (e.g., various applications installed in the memory 130) requesting access to data, and may allow accessing/editing data stored in the security module 430 or transmit the stored data, based on the result of the verification.

According to various embodiments of the disclosure, the processor 440 may receive, through the first communication scheme 310, a discovery signal broadcast by the external electronic device 600. The discovery signal may include a signal requesting a connection to the external electronic device 600 through the second communication scheme 320.

According to various embodiments of the disclosure, the processor 440 may control the second communication module 420 to activate the accessory 500 in response to reception of the discovery signal. The second communication module 420 may change an operation mode, based on control of the processor 440. The second communication module 420 may switch to an accessory mode (e.g., the accessory mode 451 in FIG. 4B) in the state in which the same operates in one mode among a card emulation mode (e.g., the card emulation mode 457 in FIG. 4B) for transmitting information, a reader mode (e.g., the reader mode 455 in FIG. 4B) for receiving information from an external electronic device, or a search mode (e.g., the search mode 453 in FIG. 4B) for searching for connectable external electronic devices. According to one embodiment, the accessory mode 451 may be a mode in which a series of operations for activating the accessory 500 can be performed. For example, the accessory mode 451 may be a mode in which the second communication module 420 supplies power to the accessory 500 by using the third communication scheme 330 and stands by to receive data transmitted by the accessory 500. The accessory 500 may transmit/receive data to/from the external electronic device 600 through the second communication scheme 320 by using the power supplied by the second communication module 420. The processor 440 may receive, in the accessory mode 451, data that the accessory 500 has received from the external electronic device 600.

According to various embodiments of the disclosure, in response to reception of the discovery signal, the processor 440 may determine, using the second communication module 420, whether the accessory 500 is sensed. The processor 440 may authenticate the accessory 500 by using the accessory 500 and the third communication scheme 330 in response to sensing of the accessory 500. For example, the processor 440 may determine whether the accessory 500 is authorized to be connectable to the electronic device 400 or whether the accessory 500 has been produced by an authentic producer. The processor 440 may control, based on the result of the authentication of the accessory 500, the second communication module 420 to switch to an accessory mode.

According to various embodiments of the disclosure, the processor 440 may determine whether to switch to the accessory mode by using service information that is included the discovery signal and that can be provided by the external electronic device 600.

According to various embodiments of the disclosure, the service information may include service identification information, a service category, or a condition in which switching to an accessory mode is not to be performed. The condition in which switching to the accessory mode is not to be performed may include a first condition in which the distance between the electronic device 400 and the external electronic device 600 exceeds a predetermined distance, a second condition in which the electronic device 400 receives the same service identification information within a predetermined time, or a third condition in which the electronic device 400 receives the same identification information within a predetermined distance. The processor 440 may identify, in the discovery signal, the condition in which switching to the accessory mode is not to be performed. The processor 440 may not switch to the accessory mode if the current condition satisfies one of various conditions included in the condition in which switching to the accessory mode is not to be performed.

According to various embodiments of the disclosure, when the electronic device 400 switches to the accessory mode, the accessory 500 may receive power through the third communication scheme 330.

According to various embodiments of the disclosure, the processor 440 may control the accessory 500 to transmit data used for authentication with the external electronic device 600 to the external electronic device 600 through the second communication scheme 320. The data used for authentication with the external electronic device 600 may be stored in the security module 430, and the applet included in the security module 430 may transmit the data used for authentication with the external electronic device 600 to the second communication module 420. The second communication module 420 may transmit, based on control of the processor 440, the data used for authentication with the external electronic device to the accessory 500 through the third communication scheme 330. The accessory 500 may receive the data transmitted by the second communication module 420, and may transmit the received data to the external electronic device 600 through the second communication scheme 320.

According to various embodiments of the disclosure, the processor 440 may receive position information of the electronic device 400 that the accessory 500 has received through the second communication scheme 320. The accessory 500 may be coupled to the electronic device 400, or may be present at a distance within which the accessory 500 is capable of transmitting/receiving data to/from the electronic device 400 through the third communication scheme 330. Position information of the accessory 500 may be substantially identical to the position information of the electronic device 400. The position information of the electronic device 400 may include at least one of information about the distance between the electronic device 400 and the external electronic device 600, or information about the movement direction of the electronic device 400, which has been transmitted by the external electronic device 600. The processor 440 may control the second communication module 420, based on the position information of the electronic device 400. For example, when the distance between the electronic device 400 and the external electronic device 600, included in the position information of the electronic device 400, exceeds a predetermined distance, the processor 440 may control the second communication module 420 to switch from the accessory mode to another mode.

According to various embodiments of the disclosure, the second communication module 420 may sense, while standing by to receive data that is to be transmitted from the accessory 500 in the accessory mode, another external electronic device supporting the third communication scheme 310. The processor 440 may control the second communication module 420 to transmit/receive data to/from the other external electronic device through the third communication scheme 310 in response to sensing the other external electronic device. In this case, the processor 440 may control the second communication module 420 to switch from the accessory mode to a card emulation mode or a reader mode.

Figure 4B:
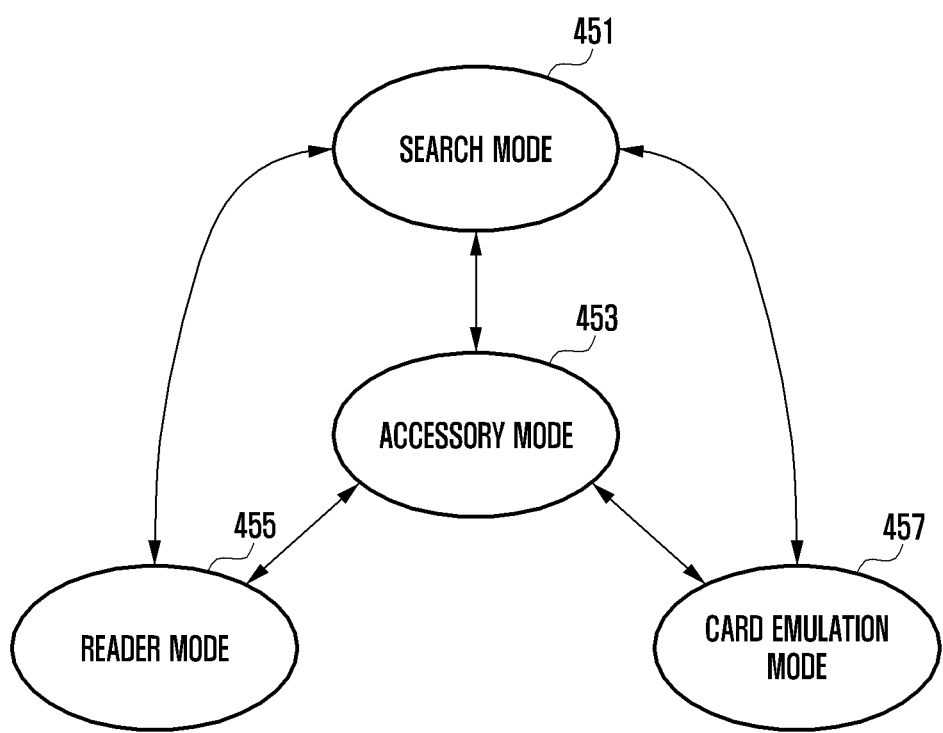
FIG. 4B illustrates operation modes of an electronic device according to various embodiments of the disclosure.

FIG. 4B illustrates switchable operation modes of the electronic device 400 according to various embodiments of the disclosure.

According to various embodiments of the disclosure, the electronic device 400 may control a second communication module (e.g., the second communication module 420 in FIG. 4) to operate in one mode among an accessory mode 451, a search mode 453, a reader mode 455, and a card emulation mode 457.

According to various embodiments of the disclosure, the accessory mode 451 may be a mode in which an accessory (e.g., the accessory 500 in FIG. 3) is controlled to transmit/receive data to/from an external electronic device 400. For example, the accessory mode may be a mode in which the second communication module 420 supplies power to the accessory 500 through the third communication scheme 330 and stand by to receive data transmitted by the accessory 500. The accessory 500 may transmit/receive data to/from the external electronic device 600 through the second communication scheme 320 by using the power supplied by the second communication module 420.

According to various embodiments of the disclosure, a search mode 453 may be an operation mode in which the electronic device 400 searches for the accessory 500 to/from which data is to be transmitted/received through the third communication scheme 330.

According to various embodiments of the disclosure, the reader mode 455 may be a mode in which the electronic device 400 receives data through the third communication scheme 330. In the reader mode 455, the electronic device 400 cannot transmit data through the third communication scheme 330.

According to various embodiments of the disclosure, the card emulation mode 457 may be a mode in which the electronic device 400 transmits data through the third communication scheme 330.

According to various embodiments of the disclosure, a processor (e.g., the processor 440 in FIG. 4A) may control the second communication module 420 to operate in the accessory mode 451 in response to determining that the accessory 500 approaches the electronic device 400 while the second communication module operates in one mode among the search mode 453, the reader mode 455, or the card emulation mode 457.

Figure 5:
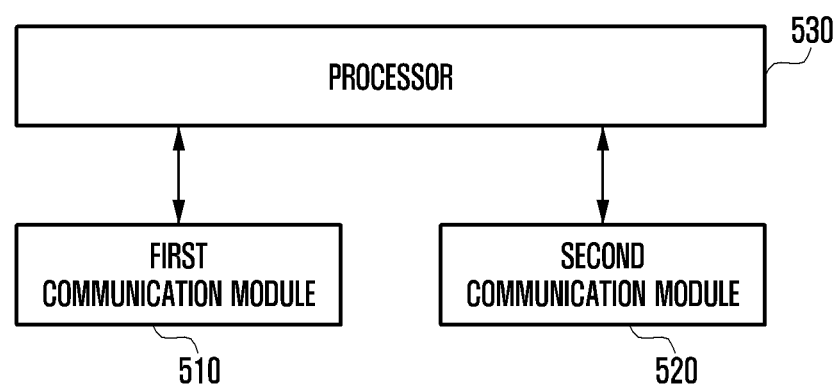
FIG. 5 is a block diagram of an accessory according to various embodiments of the disclosure.

FIG. 5 is a block diagram of an accessory according to various embodiments of the disclosure.

Referring to FIG. 5, an accessory (e.g., the accessory 500 in FIG. 3) according to various embodiments of the disclosure may include a first communication module 510, a second communication module 520, and a processor 530.

According to various embodiments of the disclosure, the accessory 500 may be attached to the electronic device 400. For example, the accessory 500 may be attached to a partial region of a housing (not shown) of the electronic device 400. In another example, the accessory 500 may be electrically connected to the electronic device 400 without being attached to the electronic device 400.

According to various embodiments of the disclosure, the first communication module 510 may transmit/receive data to/from the electronic device 400 through the third communication scheme 330. The first communication module 510 may receive, from the electronic device 400, data to be used for authentication with the external electronic device 600. The first communication module 510 may transmit, to the electronic device 400, data received from the external electronic device 600 (e.g., position information of the electronic device 400 or the result of authentication of the electronic device 400).

According to various embodiments of the disclosure, the second communication module 520 may transmit/receive data to/from the external electronic device 600 through the second communication scheme 320. The second communication module 520 may transmit, to the external electronic device 600, data to be used for authentication with the external electronic device 600. The second communication module 520 may receive, from the external electronic device 600, data related to authentication of the electronic device 400 or position information of the electronic device 400.

According to various embodiments of the disclosure, the processor 530 may control transmission/reception of data by the first communication module 510 and the second communication module 520. The processor 530 may process data that the first communication module 510 and the second communication module 520 have received, and may control the first communication module 510 and the second communication module 520 to transmit the processed data. The data processing will be described with reference to FIGS. 11A to 11D.

Figure 6:
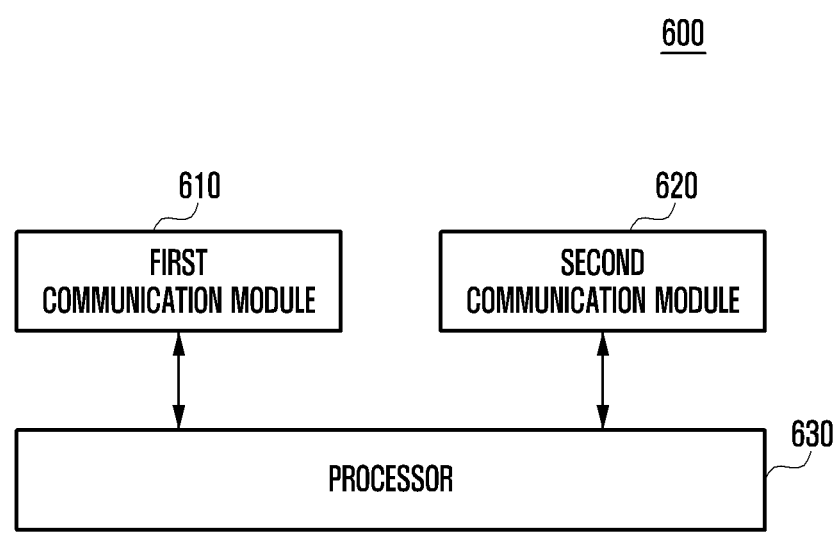
FIG. 6 is a block diagram of an external electronic device according to various embodiments of the disclosure.

FIG. 6 is a block diagram of an external electronic device according to various embodiments of the disclosure.

Referring to FIG. 6, an external electronic device (e.g., the external electronic device 600 in FIG. 3) according to various embodiments of the disclosure may include a first communication module 610, a second communication module 620, and a processor 630.

According to various embodiments of the disclosure, the first communication module 610 may transmit/receive data to/from an electronic device (e.g., the electronic device 400 in FIG. 3) through a first communication scheme (e.g., the first communication scheme 310 in FIG. 3).

According to various embodiments of the disclosure, the second communication module 620 may transmit/receive data to/from an accessory (e.g., the accessory 500 in FIG. 3), which is electrically connected to the electronic device 400, through a second communication scheme (e.g., the second communication scheme 320 in FIG. 3).

According to various embodiments of the disclosure, the processor 630 may control the first communication module 610 to broadcast, using the first communication scheme 310, a discovery signal for searching for the electronic device 400.

According to various embodiments of the disclosure, the discovery signal may include a signal which requests a connection to the external electronic device 600 to be made through the second communication scheme 320. The discovery signal may be broadcast using the first communication scheme 310 having a signal arrival range that is wider than maximum signal arrival range which can be supported by the third communication scheme 330.

According to various embodiments of the disclosure, the discovery signal may include service information that can be provided by the external electronic device 600. The service information may include service identification information, a service category, or a condition in which switching to an accessory mode is not to be performed. For example, service information may be generated in the form shown in Table 1 below, and may be broadcast while being included in a discovery signal.

TABLE 1

| Information | Type | Value | Description |
|---|---|---|---|
| Service identification information | String | Hex | Service identification information |
| Service category | String | Payment | Payment service for service use |
| | | Access | Service for determining whether access to the external electronic device is performed (e.g., check-in, check-out) |
| | | Vehicle | When the external electronic device is a vehicle, services capable of being provided by the vehicle (e.g., door opening/closing or engine on/off) |
| | | Other | Other |
| Whether to automatically end | Boolean (1 or 0) | True(1) | If true, the electronic device 400 automatically ends an accessory mode for using a service when distance information necessary for automatic ending is satisfied. |
| | | False(0) | If false, the electronic device 400 does not automatically end the accessory mode for using a service. |
| Distance information for automatic ending | Integer | Meter | The distance between the electronic device 400 and the external electronic device 600, at which the electronic device 400 automatically ends the accessory mode |
| Duplicate identifier rejection information | Boolean (1 or 0) | True(1) | If true, and one of duplicate identifier time information or duplicate identifier distance information is satisfied, the electronic device 400 rejects switching to the accessory mode when a duplicate service identifier is received. |
| | | False(0) | If false, the electronic device 400 allows switching to the accessory mode when a duplicate service identifier is received. |
| Duplicate identifier time information (Duplicate reject guard timer) | Integer | Second | The difference between the time at which a previously received identifier is received and the time at which the same identifier is received, for rejecting switching to the accessory mode |
| Duplicate identifier distance information (Duplicate Reject Guard Distance) | Integer | Meter | The distance between the external electronic device 600 and the electronic device 400, for rejecting switching to the accessory mode |

According to various embodiments of the disclosure, the electronic device 400 may receive a discovery signal transmitted by the external electronic device 600, and may transmit a response signal corresponding to the discovery signal. The external electronic device 600 may receive, using the first communication scheme 310, the response signal transmitted by the electronic device 400. For example, the response signal may include information (an identifier of the accessory 500) about the accessory 500 electrically connected to the electronic device 400.

According to various embodiments of the disclosure, the processor 630 may control the second communication module 620 to be connected to the accessory 500 through the second communication scheme 320 in response to receiving the response signal. The processor 630 may determine, based on whether a blink message transmitted by the accessory 500 is received, whether the accessory 500 transmits data. When an identifier included in the response signal is identical to an identifier of an electronic device connected through the second communication scheme 320, the processor 630 may determine that the electronic device connected through the second communication scheme 320 is the accessory 500, may be connected to the accessory 500 through the second communication scheme 320, and may transmit/receive data to/from the accessory 500.

According to various embodiments of the disclosure, the processor 630 may control the second communication module 620 to transmit/receive a signal for identifying the position of the electronic device 400 to/from the electronic device 400 via the accessory 500 through the second communication scheme 320. When the second communication scheme 320 is ultra-wideband (UWB) communication, the processor 630 may identify position information of the electronic device 400, based on a signal transmitted/received in the ranging phase defined for the ultra-wideband communication.

According to various embodiments of the disclosure, the processor 630 may receive data for authentication from the electronic device 400 by using the second communication scheme 320. The processor 630 may authenticate the electronic device 400 by using the data for authentication. The authentication of the electronic device 400 may be a procedure of determining whether the electronic device 400 has a valid right to perform various functions that can be provided by the external electronic device 600.

According to various embodiments of the disclosure, the processor 630 may authenticate the electronic device 400 in response to determining that the distance between the electronic device 400 and the external electronic device 600 is within a first distance which is a predetermined distance. When the distance between the electronic device 400 and the external electronic device 600 is within the first distance, the processor 630 may authenticate the electronic device 400 to prevent a relay attack.

According to various embodiments of the disclosure, when the authentication of the electronic device 400 fails, the processor 630 may determine that the electronic device 400 has no valid right to perform an operation related to authentication, and may not perform the operation related to the authentication.

According to various embodiments of the disclosure, when authentication of the electronic device 400 is successful, the processor 630 may perform the operation related to authentication. For example, when authentication of the electronic device 400 is successful, the processor 630 may open or close a door of the external electronic device 600.

According to various embodiments of the disclosure, when authentication of the electronic device 400 is successful, the processor 630 may track (monitor) the distance between the electronic device 400 and the external electronic device 600. The processor 630 may perform an operation related to authentication in response to determining that the distance between the electronic device 400 and the external electronic device 600 is within a predetermined distance (a second distance). The second distance may be shorter than the first distance.

According to various embodiments of the disclosure, the processor 630 may monitor the movement direction of the electronic device 400. The processor 630 may select, based on the movement direction of the electronic device 400, one operation from among operations related to authentication, and may perform the selected one operation. For example, if the movement direction of the electronic device 400 is a direction away from the external electronic device 600, the processor 630 may perform control such that an operation of closing the door of the external electronic device 600 is performed. If the movement direction of the electronic device 400 is a direction in which the electronic device 400 approaches the external electronic device 600, the processor 630 may perform control such that an operation of opening the door of the external electronic device 600 is performed. If the movement direction of the electronic device 400 is a direction away from the external electronic device 600, the processor 630 may not perform the operation related to authentication of the electronic device 400.

According to various embodiments of the disclosure, the external electronic device 600 may be not only a vehicle but may also be any electronic device configured to perform an operation related to authentication of the electronic device 400. For example, the external electronic device 600 may be a gate configured to open or close a door on the basis of the result of authentication of the electronic device 400, a device configured to control operation of another external electronic device (e.g., an IoT-based electronic device installed in a home), or an electronic device configured to perform various operations including an operation of identifying the position of the electronic device 400 at which the accessory 500 is mounted.

An electronic device according to various embodiments of the disclosure may include: a first communication module configured to communicate with an external electronic device by using a first communication scheme; an accessory configured to communicate with the external electronic device by using a second communication scheme and operatively connected to the electronic device; a second communication module configured to transmit/receive data to/from the accessory by using a third communication scheme; a security module configured to store data used for authentication with the external electronic device; and a processor operatively connected to the first communication module, the second communication module, and the security module, wherein the processor is configured to: control the second communication module to activate the accessory in response to receiving a discovery signal broadcast by the external electronic device through the first communication scheme; control the second communication module to transmit the data used for authentication with the external electronic device to the accessory through the third communication scheme; and control the accessory to transmit the data used for authentication with the external electronic device to the external electronic device through the second communication scheme.

In the electronic device according to various embodiments of the disclosure, the processor may be configured to switch an operation mode of the second communication module to an accessory mode for transmitting power to the accessory through the third communication scheme and for receiving data from the accessory through the third communication scheme.

In the electronic device according to various embodiments of the disclosure, the processor may be configured to, while transmitting power to the accessory through the third communication scheme, stand by to receive data transmitted by the accessory.

In the electronic device according to various embodiments of the disclosure, the data transmitted by the accessory may include data that the accessory receives from the external electronic device through the second communication scheme.

In the electronic device according to various embodiments of the disclosure, the processor may be configured to authenticate the accessory and determine, based on the result of the authentication, whether to switch to the accessory mode. In the electronic device according to various embodiments of the disclosure, the discovery signal may include service information capable of being provided by the external electronic device, and the service information may include an identifier of a service or a condition in which switching to the accessory mode is not to be performed.

In the electronic device according to various embodiments of the disclosure, the condition in which switching to the accessory mode is not to be performed may include one among a first condition, in which the distance between the electronic device and the external electronic device exceeds a predetermined distance, a second condition, in which the electronic device receives an identical identifier within a predetermined time, and a third condition, in which the electronic device receives an identical identifier within a predetermined distance.

In the electronic device according to various embodiments of the disclosure, the processor may be configured to: sense, while standing by to receive data that is to be transmitted from the accessory, another external electronic device supporting the third communication scheme; and transmit and receive data to and from the other external electronic device through the third communication scheme in response to sensing the other external electronic device.

In the electronic device according to various embodiments of the disclosure, the processor may be configured to control the second communication module to switch from an accessory mode to one of a card emulation mode or a reader mode in response to determining to transmit and receive data to and from the other external electronic device through the third communication scheme.

In the electronic device according to various embodiments of the disclosure, the processor may be configured to: receive, using the third communication scheme, information about a distance between the accessory and the external electronic device, which the accessory has received from the external electronic device through the second communication scheme; and control the second communication module, based on the information about the distance.

In the electronic device according to various embodiments of the disclosure, the second communication scheme may include a UWB communication scheme and the third communication scheme may be an NEC scheme.

An electronic device according to various embodiments of the disclosure may include: a first communication module configured to communicate with an external electronic device by using a first communication scheme; a second communication module configured to communicate, using a second communication scheme, with an accessory operatively connected to the external electronic device; and a processor operatively connected to the first communication module and the second communication module, wherein the processor is configured to: control the first communication module to broadcast, using the first communication scheme, a discovery signal for searching for the external electronic device; control the second communication module to be connected to the accessory through the second communication scheme in response to receiving a response signal corresponding to the discovery signal through the first communication scheme; determine a distance between the accessory and the electronic device, based on a signal including data which is transmitted by the accessory through the second communication scheme and is used to authenticate the external electronic device; authenticate, based on the data, the external electronic device in response to determining that the distance between the accessory and the electronic device is within a first distance; and perform an operation related to the authentication when the distance between the accessory and the electronic device is within a second distance and the authentication is completed.

In the electronic device according to various embodiments of the disclosure, the processor may be configured to control the second communication module to transmit the distance between the accessory and the electronic device to the accessory through the second communication scheme.

In the electronic device according to various embodiments of the disclosure, the second distance may be shorter than the first distance.

In the electronic device according to various embodiments of the disclosure, the processor may be configured to transmit, through one of the first communication scheme or the second communication scheme, a signal requesting termination of a connection using the second communication scheme.

In the electronic device according to various embodiments of the disclosure, the processor may be configured to: determine a movement direction of the accessory, based on the signal including the data used to authenticate to the external electronic device; and determine, based on the movement direction of the accessory, whether to perform the authentication.

An electronic device according to various embodiments of the disclosure may include: a first communication module configured to communicate with an external electronic device by using a first communication scheme; an accessory configured to communicate with the external electronic device by using a second communication scheme and operatively connected to the electronic device; a second communication module configured to transmit/receive data to/from the accessory by using a third communication scheme; a security module configured to store data used for authentication with the external electronic device; and a processor operatively connected to the first communication module, the second communication module, and the security module, wherein the processor is configured to: sense, while standing by to receive data that is to be transmitted from the accessory, another external electronic device supporting the third communication scheme; control the second communication module to switch from an accessory mode to one of a card emulation mode or a reader mode in response to determining to transmit and receive data to and from the other external electronic device through the third communication scheme; and control the second communication module to transmit/receive data to/from the other external electronic device.

Figure 7:
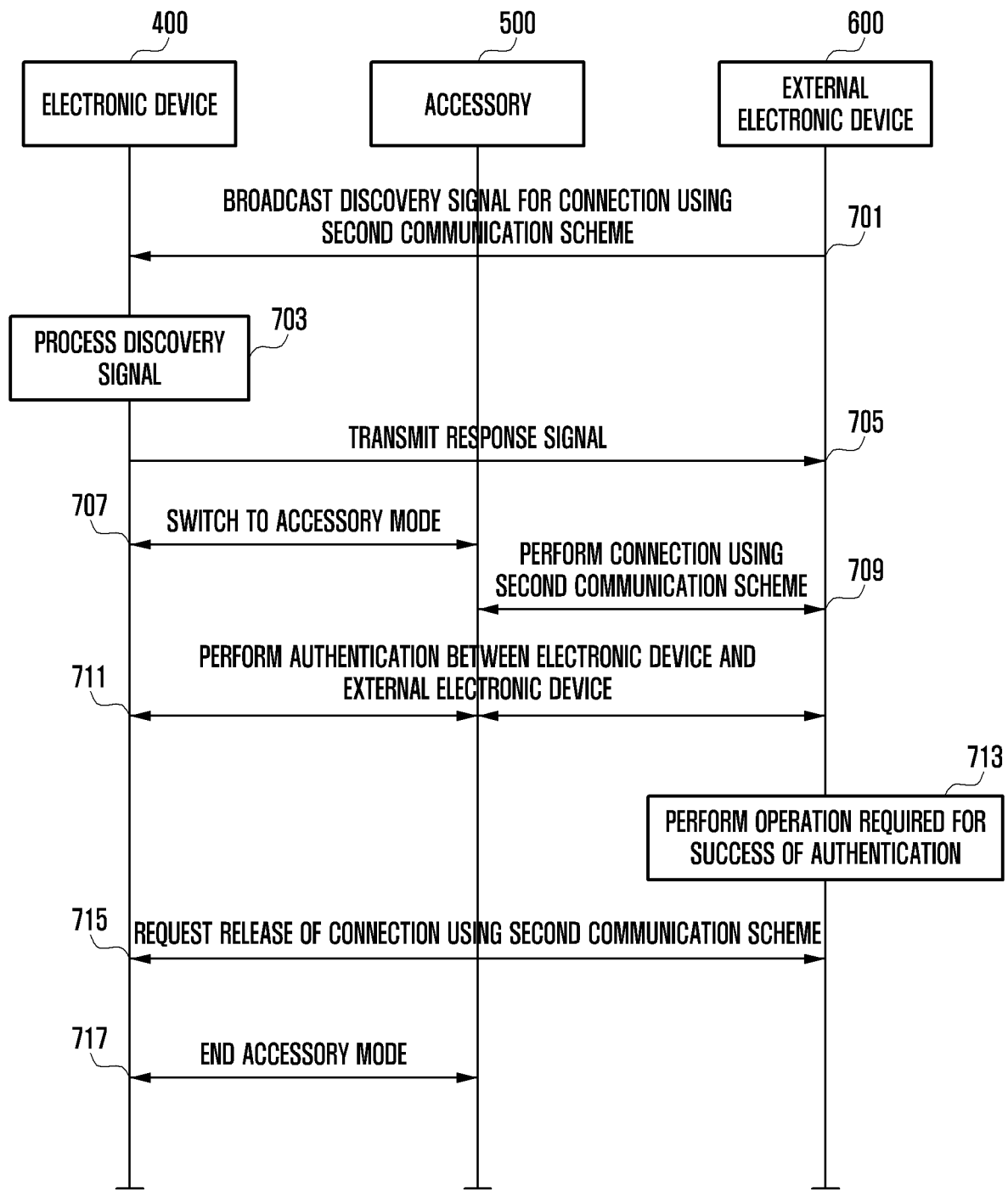
FIG. 7 is an operation flowchart illustrating operations between an electronic device, an accessory, and an external electronic device according to various embodiments of the disclosure.

FIG. 7 is an operation flowchart illustrating operations between an electronic device, an accessory, and an external electronic device according to various embodiments of the disclosure.

Referring to FIG. 7, in operation 701, an external electronic device (e.g., the external electronic device 600 in FIG. 3) may broadcast, through a first communication scheme (e.g., the first communication scheme 310 in FIG. 3), a discovery signal requesting a connection using a second communication scheme (e.g., the second communication scheme 320 in FIG. 3).

According to various embodiments of the disclosure, in operation 703, an electronic device (e.g., the electronic device 400 in FIG. 3) may receive and process the discovery signal.

According to various embodiments of the disclosure, an accessory mode may be a mode in which a series of operations for activating the accessory 500 can be performed. For example, the accessory mode may be a mode in which the electronic device 400 supplies power to the accessory 500 by using the third communication scheme 330 and stands by to receive data transmitted by the accessory 500. The accessory 500 may transmit/receive data to/from the external electronic device 600 through the second communication scheme 320 by using the power supplied by the electronic device 400.

According to various embodiments of the disclosure, the electronic device 400 may determine, based on whether user authentication is received, whether to switch to an accessory mode (e.g., the accessory mode 451 in FIG. 4B). The user authentication may include authentication using a PIN number input by a user or authentication using a user's biometric information (various types of biometric information including the user's iris, the user's fingerprint, or the user's voice pattern).

According to various embodiments of the disclosure, the electronic device 400 may also use service information, which is included in a discovery signal and can be provided by the external electronic device 600, to determine whether to switch to the accessory mode. The service information may include a condition in which switching to the accessory mode is not to be performed. The service information may be implemented in the form of Table 1 described above. The electronic device 400 may also determine, based on the condition in which switching to the accessory mode is not to be performed, whether to switch to the accessory mode.

According to various embodiments of the disclosure, the condition in which switching to the accessory mode is not to be performed may include a first condition in which the distance between the electronic device 400 and the external electronic device 600 exceeds a predetermined distance, a second condition in which the electronic device 400 receives the same service identification information within a predetermined time, or a third condition in which the electronic device 400 receives the same identification information within a predetermined distance. The electronic device 400 may identify the condition, in which switching to the accessory mode is not performed, in the discovery signal. The electronic device 400 may not switch to the accessory mode if the current condition satisfies one of the above-described conditions.

According to various embodiments of the disclosure, in operation 705, the electronic device 400 may determine whether to switch to the accessory mode for operating the accessory (e.g., the accessory 500 in FIG. 3), and may transmit a response signal to the external electronic device 600 through the first communication scheme 310.

According to various embodiments of the disclosure, the response signal may include information indicating whether the electronic device 400 switches to the accessory mode (e.g., the accessor mode 453 in FIG. 4B) and information for identification of the accessory 500. The external electronic device 600 may receive the response signal, and may activate the second communication scheme 320 in response to determining that the electronic device 400 switches to the accessory mode. The external electronic device 600 may compare the identifier of the accessory 500 with the identifier of the electronic device 400 connected through the second communication scheme 320, and may determine whether the electronic device 400 connected through the second communication scheme 320 is the accessory 500.

According to various embodiments of the disclosure, in operation 707, the electronic device 400 and the accessory 500 may switch to the accessory mode (e.g., the accessory mode 451 in FIG. 4B). According to various embodiments of the disclosure, in operation 703 of processing the discovery signal, the electronic device 400 may determine whether to switch to the accessory mode 451. Operation 707 may be performed when the electronic device 400 has determined to switch to the accessory mode 451 in operation 703.

According to various embodiments of the disclosure, in operation 709, the accessory 500 and the external electronic device 600 may be connected to each other through the second communication scheme 320.

According to various embodiments of the disclosure, the second communication scheme 320, which is different from the first communication scheme 310, may be a communication scheme capable of performing position measurement having higher accuracy than the first communication scheme 310. For example, the first communication scheme 310 may be Bluetooth or Wi-Fi, and the second communication scheme 320 may be UWB. Compared with Bluetooth or Wi-Fi, UWB is capable of performing accurate position measurement.

According to various embodiments of the disclosure, in response to determining that the third condition in which the external electronic device 600 receives the same service identification information within the predetermined distance, among the condition in which switching to the accessory mode is not to be performed, is satisfied, the external electronic device 600 may not switch to the accessory mode, and may not establish a connection with the accessory 500 by using the second communication scheme 320.

According to various embodiments of the disclosure, the accessory 500 and the external electronic device 600 may transmit/receive a signal for identifying the position of the accessory 500 to/from each other by using the second communication scheme 320. The external electronic device 600 may continuously monitor the position of the accessory 500.

According to various embodiments of the disclosure, the accessory 500 may transmit/receive data to/from the external electronic device 600 through the second communication scheme 320. The accessory 500 may continuously monitor the position of the external electronic device 600 by using the data transmitted/received to/from the external electronic device 600. According to various embodiments of the disclosure, the electronic device 400 may transmit data used for authentication through the third communication scheme 330. The data used for authentication may be stored in the security module 430 of the electronic device 400. The third communication scheme 330 is used for data transmission/reception between the electronic device 400 and the accessory 500, and may be, for example, an NEC scheme.

According to various embodiments of the disclosure, the accessory 500 may transmit the data used for authentication, which has been received from the electronic device 400 through the third communication scheme 330, to the external electronic device 600 through the second communication scheme 320.

According to various embodiments of the disclosure, the electronic device 400 may cancel switching to the accessory mode in response to determining that the second condition, in which the same identification information is received again within the predetermined distance, is satisfied.

According to various embodiments of the disclosure, in operation 711, the electronic device 400 and the external electronic device 600 may authenticate each other by using the data used for authentication. For example, the electronic device 400 and the external electronic device 600 may transmit or receive date used for authentication therebetween through the accessory 500 to authenticate each other.

According to various embodiments of the disclosure, the external electronic device 600 may authenticate the electronic device 400 in response to determining that the distance between the accessory 500 and the external electronic device 600 is within a first distance which is predetermined. When the distance between the accessory 500 and the external electronic device 600 is within the first distance, the external electronic device 600 may authenticate the electronic device 400 to prevent a relay attack.

According to various embodiments of the disclosure, in operation 713, the external electronic device 600 may perform an operation related to authentication. If authentication of the electronic device 400 is successful, the external electronic device 600 may perform an operation required for the success of authentication. If authentication of the electronic device 400 fails, the external electronic device 600 may not perform an operation required for the success of authentication.

According to various embodiments of the disclosure, the external electronic device 600 may continuously track (or monitor) the distance between the accessory 500 and the external electronic device 600. The external electronic device 600 may perform an operation related to authentication in response to determining that the distance between the accessory 500 and the external electronic device 600 is within a predetermined distance (a second distance). The second distance may be a distance which is shorter than the first distance.

According to various embodiments of the disclosure, if the external electronic device 600 is a vehicle, the external electronic device 600 may authenticate the electronic device 400 in response to determining that the accessory 500 is positioned within the first distance. If the authentication of the electronic device 400 is successful, the external electronic device 600 may open a door or start the engine of the vehicle in response to determining that the accessory 500 is positioned within the second distance.

According to various embodiments of the disclosure, in operation 715, the external electronic device 600 or the electronic device 400 may transmit a signal requesting release of the connection using the second communication scheme 320.

According to various embodiments of the disclosure, the external electronic device 600 may transmit a signal, requesting release of the connection using the second communication scheme 320, to the electronic device 400 through the first communication scheme 310.

According to various embodiments of the disclosure, the external electronic device 600 may transmit a signal, requesting release of the connection using the second communication scheme 320, to the accessory 500 through the second communication scheme 320. The accessory may transmit the received signal, requesting release of the connection using the second communication scheme 320, to the electronic device 400 through the third communication scheme 330.

According to various embodiments of the disclosure, the electronic device 400 may transmit, to the external electronic device 600, a signal requesting release of the connection using the second communication scheme 320. For example, in response to determining that the first condition, in which the distance between the electronic device 400 and the external electronic device 600 exceeds the predetermined distance, is satisfied, the electronic device 400 may transmit, to the external electronic device 600, a signal requesting release of a connection using the second communication scheme 320. The signal that is transmitted by the electronic device 400 and requests release of the connection using the second communication scheme 320 may be transmitted to the external electronic device 600 through the first communication scheme 310 or the third communication scheme 330.

According to various embodiments of the disclosure, in operation 717, the electronic device 400 and the accessory 500 may end the accessory mode in response to receiving the signal requesting release of the connection using the second communication scheme 320.

According to various embodiments of the disclosure, when the signal requesting release of a connection using the second communication scheme 320 is received from the external electronic device 600, the electronic device 400 may control the second communication module 420 to stop supply of power to the accessory 500.

According to various embodiments of the disclosure, in response to receiving the signal requesting release of the connection using the second communication scheme 320 from the accessory 500, the second communication module 420 may stop the supply of power to the accessory 500, and may transmit, to the processor 440, a signal indicating that the connection using the second communication scheme has been released.

Figure 8:
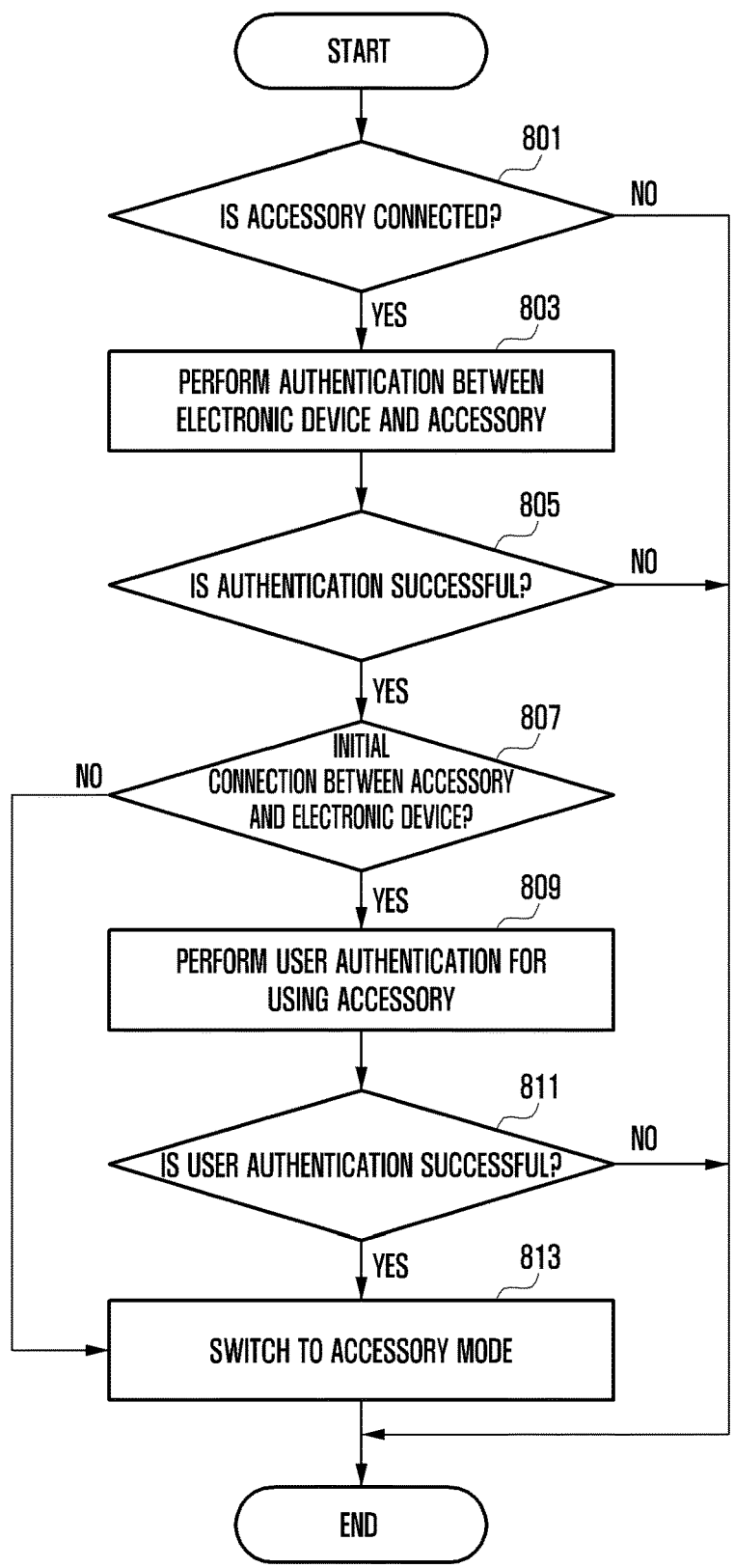
FIG. 8 is an operation flowchart illustrating an operation of authenticating an accessory in order to transmit/receive data to/from the accessory in an electronic device according to various embodiments of the disclosure.

FIG. 8 is an operation flowchart illustrating an operation of authenticating an accessory in order to transmit/receive data to/from the accessory in an electronic device according to various embodiments of the disclosure.

According to various embodiments of the disclosure, the operation of authenticating an accessory may correspond to the accessory mode switching operation 707 in FIG. 7. Operations 801 to 813 illustrated in FIG. 8 may be performed by the electronic device 400 or the processor 440 of the electronic device 400.

According to various embodiments of the disclosure, in operation 801, the electronic device 400 may determine whether an accessory has been connected thereto.

According to various embodiments of the disclosure, the electronic device 400 may determine whether the electronic device 400 and the accessory 500 are connected to each other, by sensing, using a hall sensor included in the electronic device 400, whether there is a magnet included in the accessory 500. The electronic device 400 may also determine whether the electronic device 400 and the accessory 500 are connected to each other, by sensing the presence or absence of the accessory 500 through the third communication scheme 330 while the electronic device 400 operates in a search mode (e.g., the search mode 453 in FIG. 4B).

According to various embodiments of the disclosure, in operation 803, the electronic device 400 may authenticate the accessory 500.

According to various embodiments of the disclosure, the authentication of the accessory 500 may include whether a manufacturer of the accessory 500 is an approved manufacturer capable of using the electronic device 400.

According to various embodiments of the disclosure, in operation 805, the electronic device 400 may determine whether authentication of the accessory 500 is successful.

According to various embodiments of the disclosure, in operation 807, in response to determining that authentication of the accessory 500 is successful, the electronic device 400 may determine whether the connection between the accessory 500 and the electronic device 400 is the initial connection.

According to various embodiments of the disclosure, the electronic device 400 may determine whether the connection between the accessory 500 and the electronic device 400 is the initial connection, by identifying a connection history of the accessory 500, stored in a memory (not shown).

According to various embodiments of the disclosure, in operation 813, the electronic device 400 may switch to an accessory mode (e.g., the accessory mode 451 in FIG. 4B) in response to determining that the accessory 500 and the electronic device 400 are not initially connected to each other.

According to various embodiments of the disclosure, the accessory mode may be a mode in which a series of operations for activating the accessory 500 can be performed. For example, the accessory mode may be a mode in which the second communication module 420 supplies power to the accessory 500 through the third communication scheme 330 and stands by to receive data transmitted by the accessory 500. The processor 440 of the electronic device 400 may control the second communication module 420 to switch to the accessory mode.

According to various embodiments of the disclosure, in operation 809, the electronic device 400 may perform user authentication for using the accessory 500 in response to determining that the accessory 500 is initially connected.

According to various embodiments of the disclosure, the electronic device 400 may perform the user authentication for using the accessory 500 by performing user authentication using a PIN number input by a user or by performing user authentication using a user's biometric information.

According to various embodiments of the disclosure, in operation 811, the electronic device 400 may determine whether the user authentication is successful. In response to determining that the user authentication is successful, the electronic device 400 may switch to the accessory mode in operation 813. When it is determined that the user authentication fails, the electronic device 400 may not switch to the accessory mode.

According to various embodiments of the disclosure, when the electronic device 400 switches to the accessory mode, the electronic device 400 may supply power to the accessory 500, and the accessory 500 may transmit information necessary for being connected to the external electronic device 600 through the second communication scheme 320. The information necessary for connecting the accessory 500 to the external electronic device 600 through the second communication scheme 320 may be service information included in a discovery signal. The accessory 500 may be connected to the external electronic device 600 through the second communication scheme 320 by using parameters included in the service information.

Figure 9:
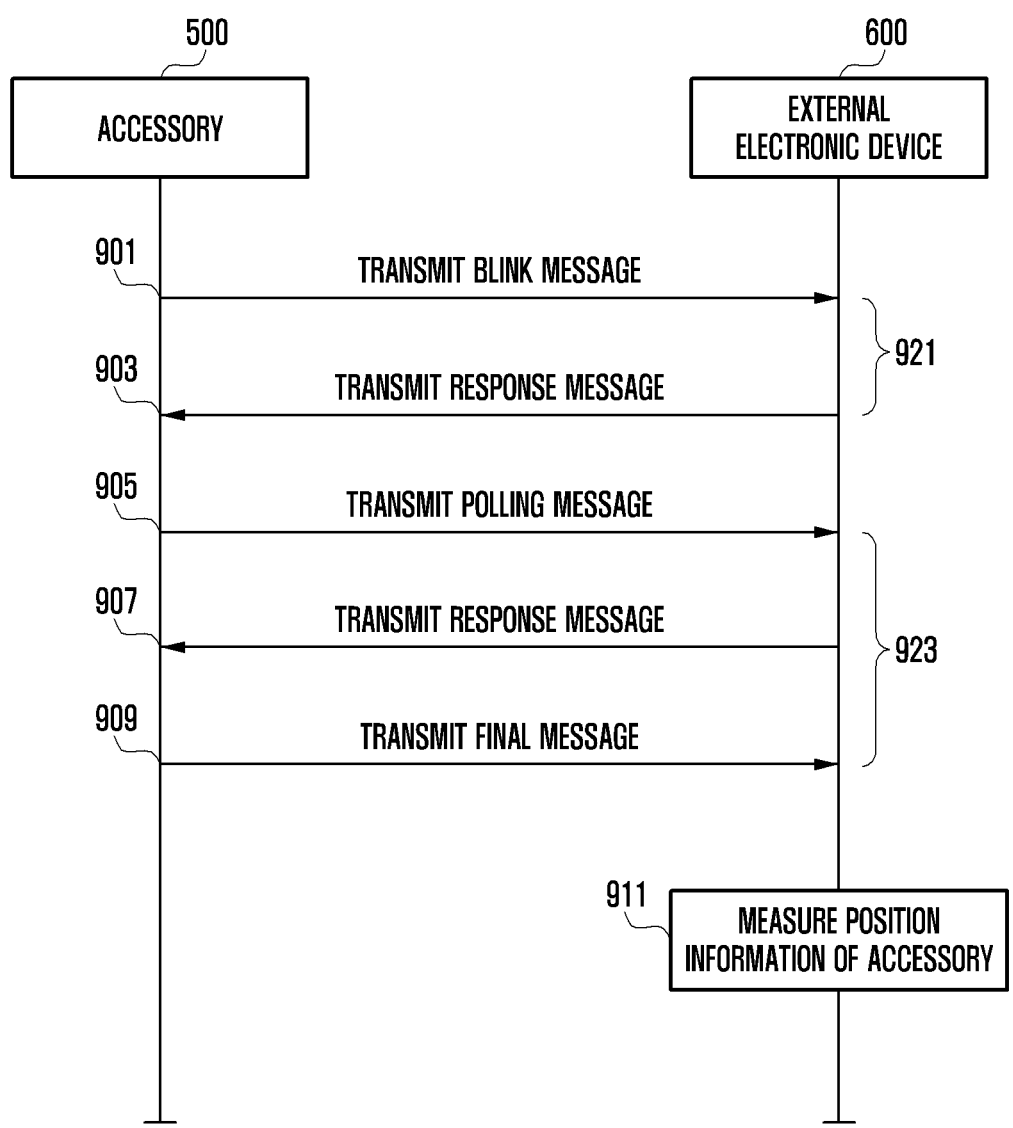
FIG. 9 is an operation flowchart illustrating an operation in which an external electronic device measures the position of an accessory connected to an electronic device according to various embodiments of the disclosure.

FIG. 9 is an operation flowchart illustrating an operation in which an external electronic device measures the position of an accessory connected to an electronic device according to various embodiments of the disclosure.

According to various embodiments of the disclosure, the operation of measuring the position of an accessory may be continuously performed from the time at which the accessory (e.g., the accessory 500 in FIG. 3) and an external electronic device (e.g., the external electronic device 600 in FIG. 3) are connected to each other through a second communication scheme (e.g., the second communication scheme 320 in FIG. 3) until the accessory and the external electronic device are disconnected from each other. For example, the second communication scheme 320 may be ultra-wideband (UWB) communication using a wide frequency band of several GHz (e.g., 3.1 GHz to 10.6 GHz). The operation of measuring the position of the accessory may be divided into a discovery phase 921 including operations 901 and 903 and a ranging phase 923 including operations 905, 907, and 909. The discovery phase 921 may be performed once when the accessory 500 is connected to the external electronic device 600, and the ranging phase 923 may be periodically or repeatedly performed from the time when the accessory 500 is connected to the external electronic device 600 until the time when the accessory 500 is disconnected from the external electronic device 600.

According to various embodiments of the disclosure, in operation 901, the accessory 500 may transmit a blink message to the external electronic device 600. The blink message may include accessory identification information (an accessory address or accessory ID). The accessory 500 may transmit the blink message until the external electronic device 600 receives a response message corresponding to the blink message.

According to various embodiments of the disclosure, in operation 903, the external electronic device 600 may transmit a response message in response to reception of the blink message. The response message may include a ranging initiation message providing notification of the start of the ranging phase. The message providing notification of the start of the ranging phase may include response message arrival information (e.g., the address of the accessory 500). When operation 903 is completed, the accessory 500 and the external electronic device 600 may switch from the discovery phase 921 to the ranging phase 923.

According to various embodiments of the disclosure, in operation 905, the accessory 500 may transmit a polling message to the external electronic device 600 through the second communication scheme 320. The polling message may be used when the external electronic device 600 measures position information of the accessory 500.

According to various embodiments of the disclosure, in operation 907, in response to reception of the polling message, the external electronic device 600 may transmit a response message corresponding to the polling message to the accessory 500 through the second communication scheme 320.

According to various embodiments of the disclosure, in operation 909, the accessory 500 may transmit a final message to the external electronic device 600 through the second communication scheme 320 in response to reception of the response message.

According to various embodiments of the disclosure, in operation 911, the external electronic device 600 may measure position information of the accessory 500.

According to various embodiments of the disclosure, the external electronic device 600 may measure, using a time-of-flight (TOF) method, the position information of the accessory 500 by using at least some of the time of receiving the polling message, the time of transmitting the response message, or the time of receiving the final message. The position information of the accessory 500 may include information about the distance between the accessory 500 and the external electronic device 600 or the position of the accessory 500, which has been measured by the external electronic device 600 (e.g., relative positions of the external electronic device 600 and the accessory 500).

According to various embodiments of the disclosure, the external electronic device 600 may measure the movement direction of the accessory 500 by using an angle-of-arrival (AOA) method.

According to various embodiments of the disclosure, the external electronic device 600 may also include the measured position information of the accessory 500 in the response message in operation 907 and then transmit the response message to the accessory 500. The accessory 500 may identify the response message received in operation 907 and identify the position information of the accessory 500, included in the response message.

FIG. 9 has been drawn up with reference to the situation in which the external electronic device 600 measures the position information of the accessory 500, but the accessory 500 may also use the operations illustrated in FIG. 9 to identify the position information of the external electronic device 600.

Figure 10:
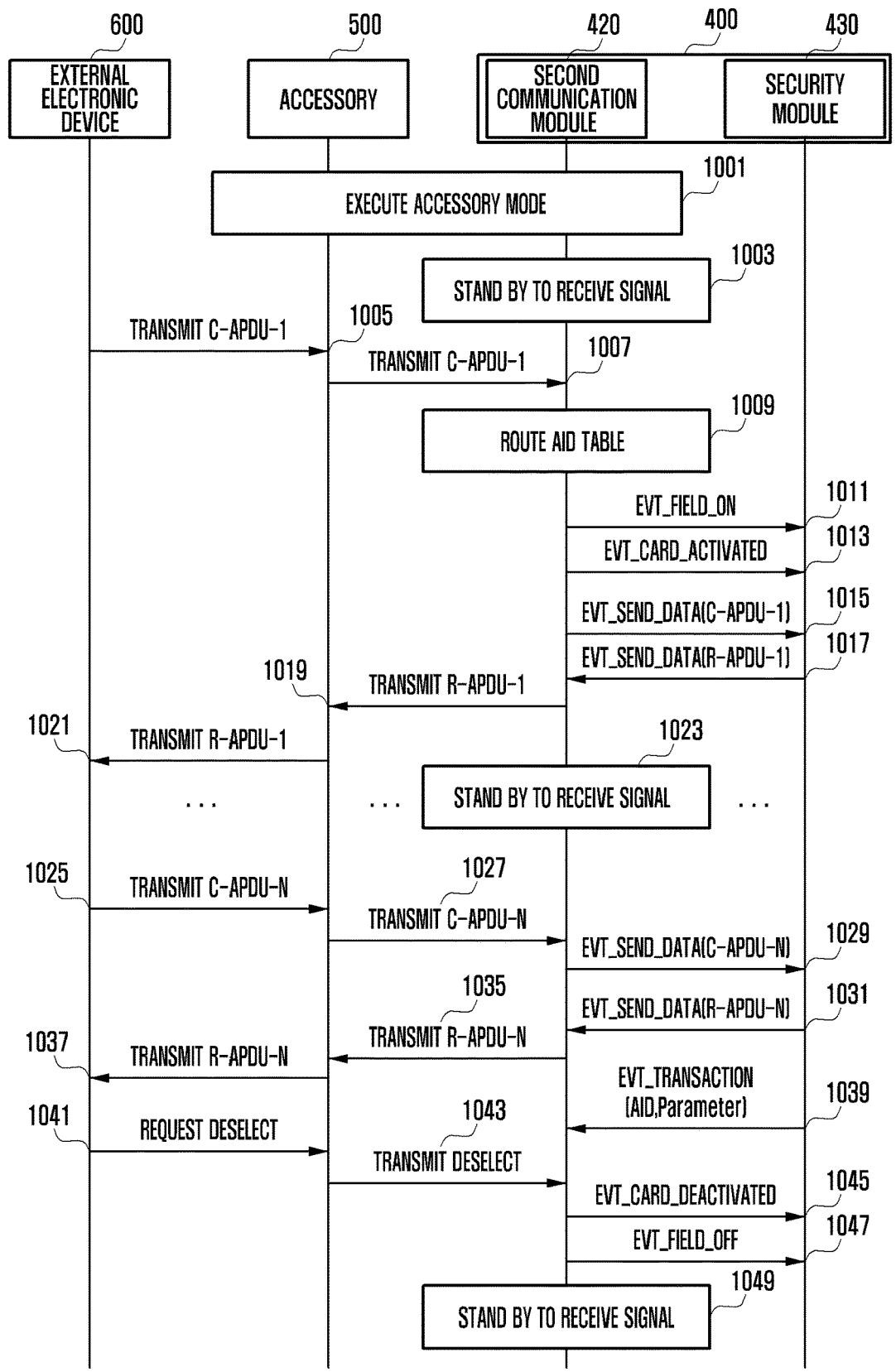
FIG. 10 is an operation flowchart illustrating a specific operation of transmitting/receiving data among an electronic device, an accessory, and an external electronic device according to various embodiments of the disclosure.

FIG. 10 is an operation flowchart illustrating a specific operation of transmitting/receiving data among an electronic device, an accessory, and an external electronic device according to various embodiments of the disclosure.

Referring to FIG. 10, in operation 1001, an accessory (e.g., the accessory 500 in FIG. 3) and a second communication module (e.g., the second communication module 420 in FIG. 4) may execute an accessory mode (e.g., the accessory mode 451 in FIG. 4B).

According to various embodiments of the disclosure, after the accessory mode is executed, in operation 1003, the second communication module 420 of the electronic device 400 may supply power to the accessory 500, and may stand by to receive data that is to be transmitted by the accessory 500.

According to various embodiments of the disclosure, in the accessory mode, the second communication module 420 may sense another external electronic device, which supports the third communication scheme 330, while standing by to receive the data that is to be transmitted from the accessory 500. The processor 440 of the electronic device 400 may control the second communication module 420 to transmit/receive data to/from the other external electronic device through the third communication scheme 330 in response to sensing the other external electronic device. In this case, the processor 440 may control the second communication module 420 to switch from the accessory mode to a card emulation mode or a reader mode.

According to various embodiments of the disclosure, in operation 1005, the external electronic device 600 may transmit data (command application protocol data unit (C-APDU-1)) to the accessory 500. For example, the external electronic device 600 may transmit data, which instructs the electronic device 400 to transmit an application identifier (application identification (AID)) list stored in the electronic device 400, to the accessory 500 through a second communication scheme (e.g., the second communication scheme 320 in FIG. 3).

According to various embodiments of the disclosure, data transmitted and received by the electronic device 400, the accessory 500, and the external electronic device 600 may follow a data standard defined as one application protocol data unit (APDU). Data transmitted while the external electronic device 600 transmits a command to the accessory 500 may be defined as a command-application protocol data unit (C-APDU), and data transmitted while the electronic device 400 responds to the external electronic device 600 may be defined as a response application protocol data unit (R-APDU). According to various embodiments of the disclosure, the electronic device 400, the accessory 500, and the external electronic device 600 may perform operations below by using the data standard defined according to C-APDU and R-APDU formats.

According to various embodiments of the disclosure, in operation 1007, the accessory 500 may transmit the data (C-APDU-1), which has been received from the external electronic device 600 through the second communication scheme 320, through a third communication scheme (e.g., the third communication scheme 330 in FIG. 3).

According to various embodiments of the disclosure, in operation 1009, the second communication module 420 may route an AID table in which multiple AIDs are mapped to addresses of security modules 430 respectively corresponding to the multiple AIDs.

According to various embodiments of the disclosure, the second communication module 420 may use the AID table to identify the security module 430 corresponding to an AID transmitted by the external electronic device 600.

According to various embodiments of the disclosure, in operation 1011, the second communication module 420 may transmit, to the identified security module 430, a signal (EVT_FIELD_ON) indicating that an event has occurred.

According to various embodiments of the disclosure, in operation 1013, the second communication module 420 may transmit, to the security module 430, a signal (EVT_CARD_ACTIVATED) requesting that the security module 430 be activated.

According to various embodiments of the disclosure, in operation 1015, the second communication module 420 may transmit C-APDU-1, transmitted in operation 1005, to the security module 430. In operation 1017, the second communication module 420 may transmit R-APDU-1 corresponding to C-APDU-1 to the second communication module 420. In operation 1019, the second communication module 420 may transmit R-APDU-1 to the accessory 500 through the third communication scheme 330. In operation 1021, the accessory 500 may transmit R-APDU-1 to the external electronic device 600 through the second communication scheme 320.

According to various embodiments of the disclosure, the external electronic device 600 may transmit an AID for providing a service of the external electronic device 600, and may request the electronic device 400 to transmit data for authentication corresponding to the AID (C-APDU). The electronic device 400 may identify, using the AID table, the security module 430 corresponding to the AID, and may transmit data stored in the security module 430 to the external electronic device 600 (R-APDU). The above-described operations may be performed using C-APDU and R-APDU. According to various embodiments of the disclosure, operations 1025 to 1037 may be illustrated as transmitting/receiving data for authentication by using multiple C-APDUs and R-APDUs. According to various embodiments of the disclosure, when the transmission of R-APDU is completed, the second communication module 420 may stand by to receive a signal transmitted by the accessory 500. If multiple R-APDUs are transmitted, the second communication module 420 may stand by to receive a signal transmitted by the accessory 500 whenever transmission of each R-APDU is completed. For example, in operation 1023, when the transmission of R-APDU-1 is completed, the second communication module 420 may stand by to receive a signal transmitted by the accessory 500.

According to various embodiments of the disclosure, in operation 1039, the security module 430 may transmit an authentication processing result (EVT_TRANSACTION) to the second communication module 420. Operation 1039 may be omitted depending on a configuration pertaining to whether the authentication processing result is to be transmitted from the security module 430.

According to various embodiments of the disclosure, in operation 1041, when the authentication is completed, the external electronic device 600 may transmit a signal (DESELECT), indicating that the authentication is completed, to the accessory 500 through the second communication scheme 320.

According to various embodiments of the disclosure, in operation 1043, the accessory 500 may transmit the signal, indicating that the authentication is completed, to the second communication module 420 through the third communication scheme 330.

According to various embodiments of the disclosure, in operation 1045, the second communication module 420 may transmit, to the security module 430, a signal (EVT_CARD_DEACTIVATED) requesting that the security module 430 be deactivated.

According to various embodiments of the disclosure, in operation 1047, the second communication module 420 may transmit, to the identified the security module 430, a signal (EVT_FIELD_OFF) indicating that the event has ended.

According to various embodiments of the disclosure, in operation 1049, the second communication module 420 may stand by to receive a signal transmitted by the accessory 500. In the card emulation mode defined in ISO14443-4, the second communication module 420 may switch to a deactivated state in response to receiving the EVT_CARD_DEACTIVATED signal. According to various embodiments of the disclosure, if the accessory mode is not ended, even when the EVT_CARD_DEACTIVATED signal is received, the second communication module 420 may supply power to the accessory 500 and stand by to receive a signal transmitted by the accessory 500.

FIGS. 11A to 11D illustrate the structure of data transmitted/received among an electronic device, an accessory, and an external electronic device according to various embodiments of the disclosure.

According to various embodiments of the disclosure, due to the restricted performance of a processor (e.g., the processor 530 in FIG. 5) of the accessory (e.g., the accessory 500 in FIG. 3), the speed at which the processor 530 processes data transmitted by the electronic device 400 or the external electronic device 600 may be low. The electronic device 400 and the external electronic device 600 may transmit data to the accessory 500 in a structure defined to enable the processor 530 of the accessory 500 to easily process the data.

Figure 11A:
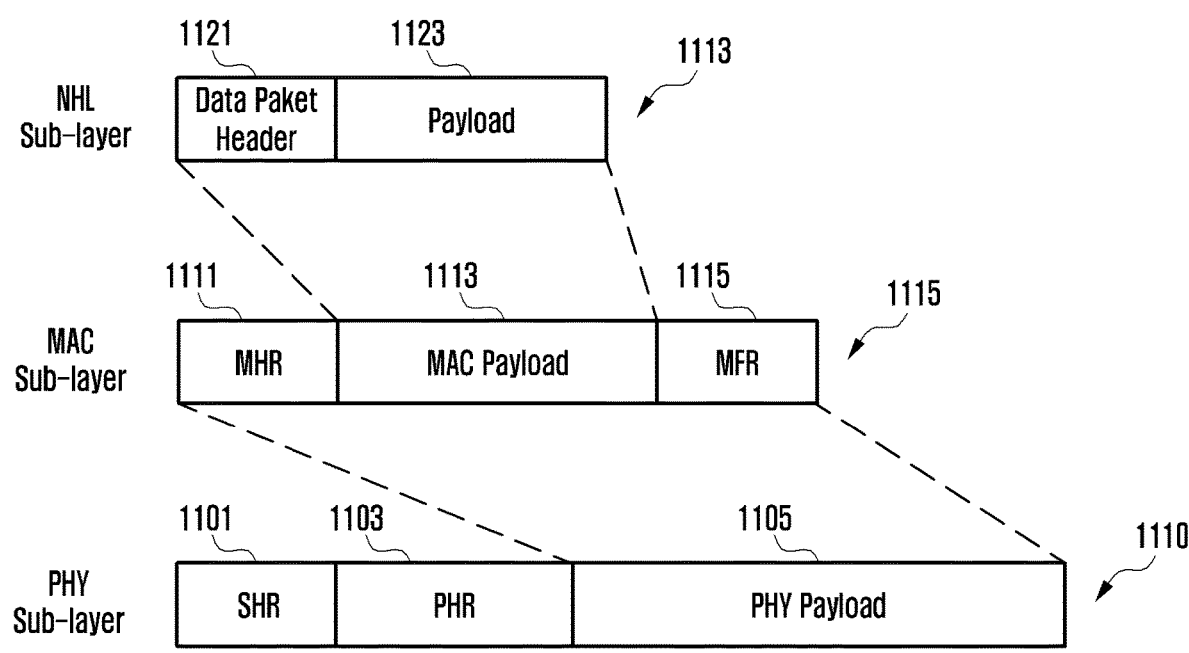
FIGS. 11A to 11D illustrate the structure of data transmitted/received among an electronic device, an accessory, and an external electronic device according to various embodiments of the disclosure.

Referring to FIG. 11A, first data 1110 transmitted/received by the accessory 500 and the external electronic device 600 is illustrated. The first data 1110 may include a synchronization header (SHR) 1101 for synchronization, a PHY header (PHR) 1103, which refers to a header of a physical layer, and a PHY payload 1105.

According to various embodiments of the disclosure, the PHY payload 1105 may include data for authentication or data including an authentication result. A second communication module (e.g., the second communication module 520 in FIG. 5) of the accessory 500 may extract the PHY payload 1105 from the first data. The PHY payload 1105 may be implemented in a structure defined in a MAC sublayer. The PHY payload 1105 may include: a MAC header (MHR) 1111 which is the start portion of the MAC layer); a MAC payload 1113 including data for authentication or data including an authentication result; and a MAC footer (MFR) 1115 which is the end portion of the MAC layer). The PHY payload may be transmitted in the form of the PHY payload 1105 when the second communication module 520 transmits data to the processor 530.

According to various embodiments of the disclosure, the MAC payload 1113 may include a data packet header 1121 and a payload 1123. The payload 1123 may include data for authentication or data including an authentication result.

According to various embodiments of the disclosure, the processor 530 may extract the payload 1123 from the MAC payload 1113 included in the PHY payload 1105, and may transmit the extracted payload 1123 to the first communication module 510. The first communication module 510 may transmit the payload 1123 to the electronic device 400 through the third communication scheme 330.

Figure 11B:
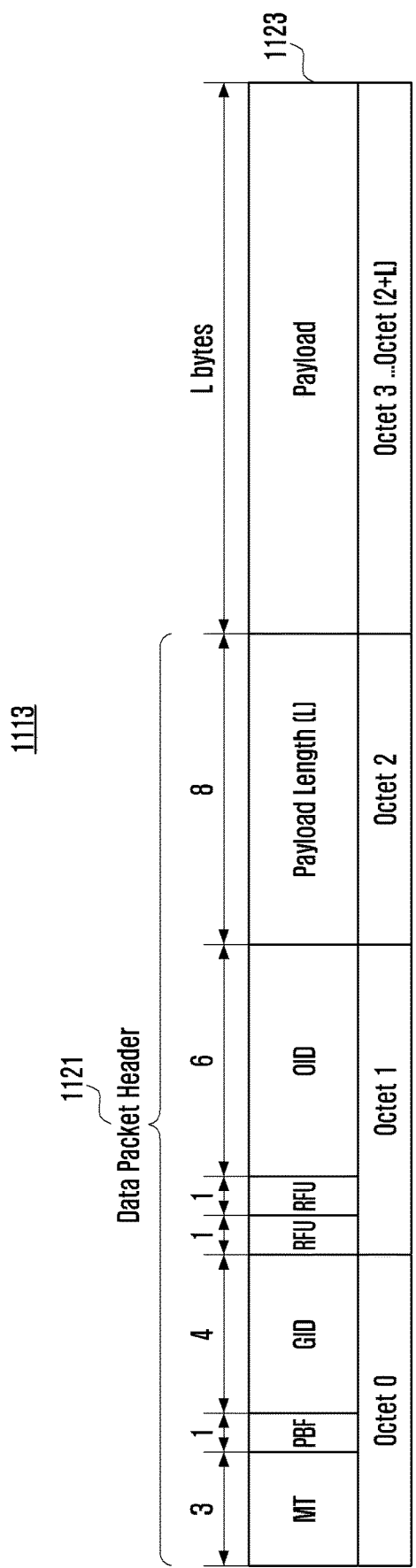

FIG. 11B illustrates an embodiment of the MAC payload 1113, and illustrates the MAC payload 1113 for transmitting a control packet.

The packet header 1121 may include: MT (Table 2) indicating a command message or a response message; PBF (Table 3) indicating whether a message is a complete message (or indicating whether there is an additional message to be transmitted); GID (Table 4) indicating a single receiver; and OID (Table 5) indicating whether a connection using a third communication scheme has been terminated. Tables 2 to 5 show examples of values that MT, PBF, GID, and OID are capable of having. The MAC payload 1113 may include various data including data for authentication of the electronic device 400.

TABLE 2

| MT | Description |
|---|---|
| 001b | Command message |
| 010b | Response message |

TABLE 3

| PBF | Description |
|---|---|
| 0b | Complete message or final message |
| 1b | Including a part of message. |

TABLE 4

| GID | Description |
|---|---|
| 1111b | Proprietary message |

TABLE 5

| OID | Description |
|---|---|
| 100001b | Terminate connection using second communication scheme |

Figure 11C:
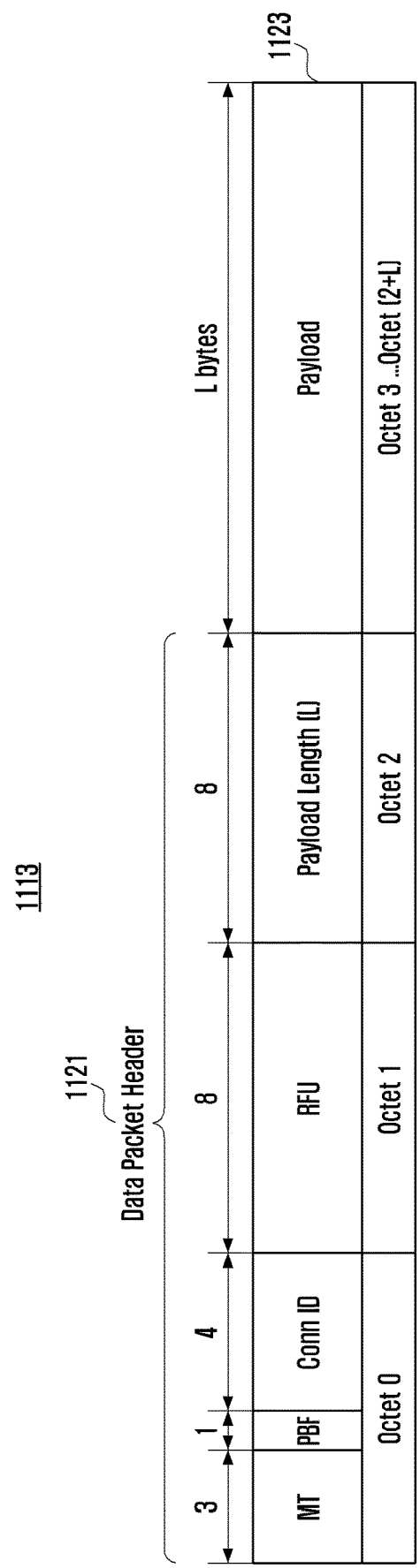

FIG. 11C illustrates an embodiment of the MAC payload 1113, and illustrates the MAC payload 1113 for transmitting a data packet.

The packet header 1121 may include: MT (Table 6) indicating a data packet; and Conn ID (Table 7) indicating a static RF connection. Tables 6 and 7 show examples of values that MT and Conn ID are capable of having. The MAC payload 1113 may include various data including data for authentication of the electronic device 400.

TABLE 6

| MT | Description |
| --- | --- |
| 000b | Data packet |

TABLE 7

| Conn ID | Description |
| --- | --- |
| 0000b | Static RF Connection for UWB |

Figure 11D:
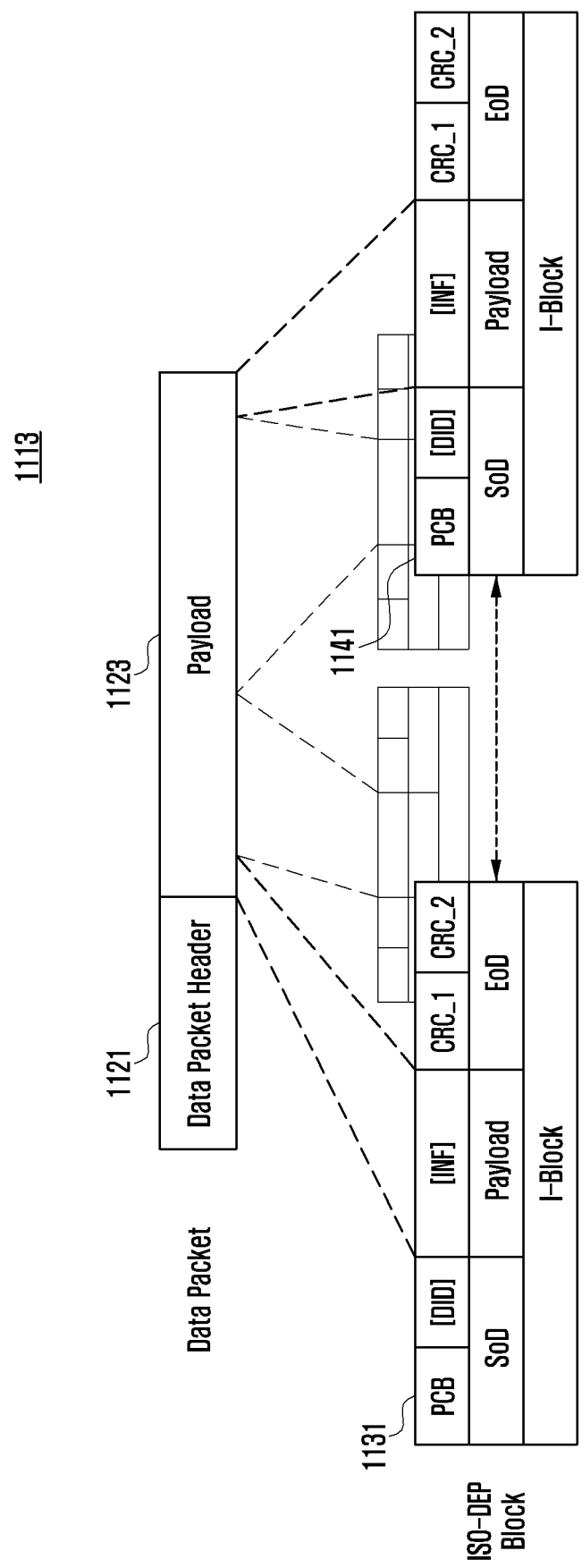

FIG. 11D illustrates an embodiment of the MAC payload 1113, and illustrates the structure of data that the first communication module 510 transmits to the electronic device 400 through the third communication scheme 330.

According to various embodiments of the disclosure, the first communication module 510 may transmit the MAC payload 1113, including the packet header 1121 and the payload 1123, to the electronic device 400 through the third communication scheme 330. The payload 1123 may be transmitted using multiple blocks which are implemented in the structure defined in ISO-DEP.

Figure 12:
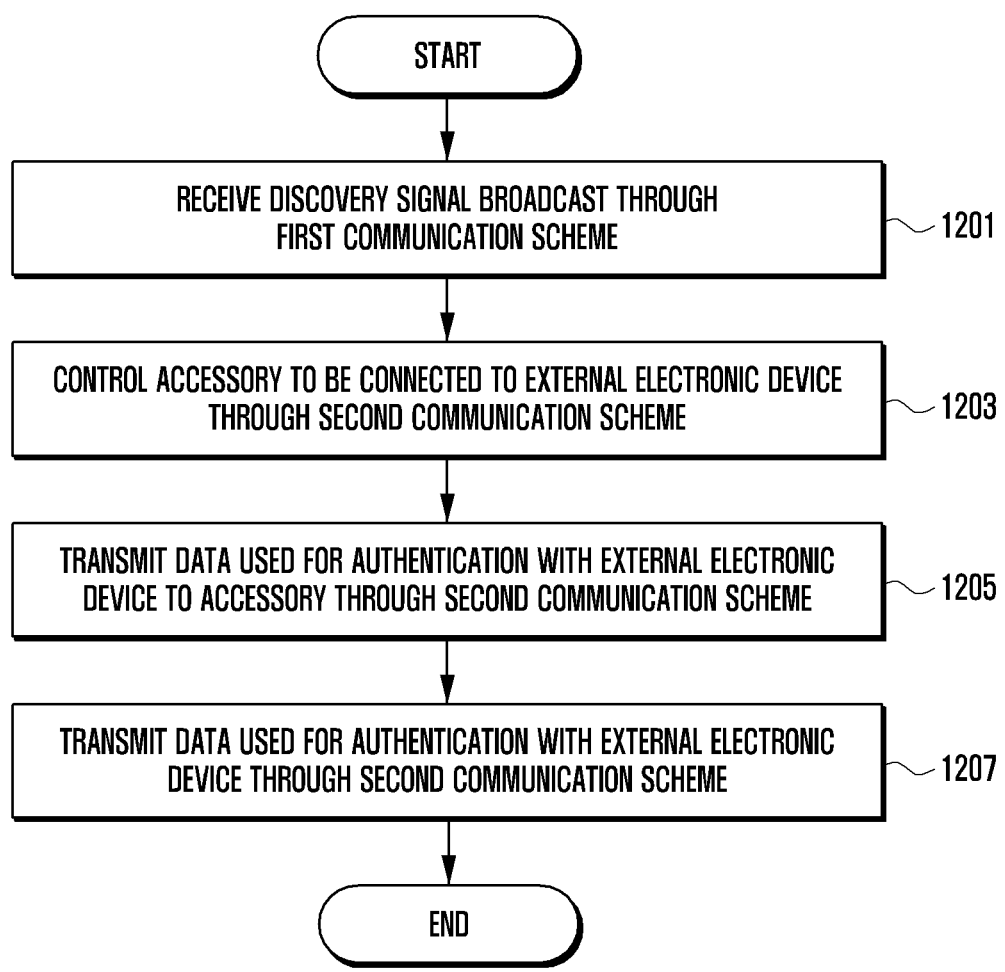
FIG. 12 is an operation flowchart illustrating an operation method of an electronic device according to various embodiments of the disclosure.

FIG. 12 is an operation flowchart illustrating an operation method of an electronic device according to various embodiments of the disclosure.

According to various embodiments of the disclosure, in operation 1201, an electronic device (e.g., the electronic device 400 in FIG. 3) may receive a discovery signal broadcast through a first communication scheme (e.g., the first communication scheme 310 in FIG. 3).

According to various embodiments of the disclosure, the first communication scheme 310 may be a communication scheme which can be supported by the electronic device 400. For example, the first communication scheme 310 may be various communication schemes including Bluetooth, low-power Bluetooth (BLE), communication using a cellular network, or Wi-Fi. The electronic device 400 may receive, using the first communication scheme 310, a discovery signal broadcast by the external electronic device 600.

According to various embodiments of the disclosure, in operation 1203, the electronic device 400 may control an accessory (e.g., the accessory 500 in FIG. 3) to be connected to an external electronic device (e.g., the external electronic device 600 in FIG. 3) through a second communication scheme (e.g., the second communication scheme 320 in FIG. 3.

According to various embodiments of the disclosure, the electronic device 400 may switch to an accessory mode (e.g., the accessory mode 451 in FIG. 4B) to control the accessory 500.

According to various embodiments of the disclosure, the accessory mode may be a mode in which a series of operations for activating the accessory 500 can be performed. For example, the accessory mode may be a mode in which the electronic device 400 supplies power to the accessory 500 through the third communication scheme 330 and stands by to receive data transmitted by the accessory 500. The accessory 500 may transmit/receive data to/from the external electronic device 600 through the second communication scheme 320 by using the power supplied by the electronic device 400.

According to various embodiments of the disclosure, the electronic device 400 may determine whether to switch to the accessory mode, based on whether user authentication is received. The user authentication may include authentication using a PIN number input by a user or authentication using a user's biometric information (various types of biometric information including the user's iris, the user's fingerprint, or the user's voice pattern).

According to various embodiments of the disclosure, the electronic device 400 may also determine whether to switch to the accessory mode, by using service information which is based on the discovery signal received in operation 1201 and can be provided by the external electronic device 600. For example, the service information may include a condition in which switching to the accessory mode is not to be performed. The service information may be implemented in the form of Table 1 described above. The electronic device 400 may also determine whether to switch to the accessory mode, based the condition in which switching to the accessory mode is not to be performed.

According to various embodiments of the disclosure, the second communication scheme 320 is different from the first communication scheme 310, and may be a communication scheme capable of performing position measurement having higher accuracy than the first communication scheme 310.

According to various embodiments of the disclosure, in operation 1205, the electronic device 400 may transmit data used for authentication with the external electronic device 600 to the accessory 500 through a third communication scheme (e.g., the third communication scheme 330 in FIG. 3).

According to various embodiments of the disclosure, the data used for authentication may be stored in the security module 430 of the electronic device 400. The third communication scheme 330, which is used for data transmission/reception between the electronic device 400 and the accessory 500, may be, for example, an NFC scheme.

According to various embodiments of the disclosure, in operation 1207, the electronic device 400 may control the accessory 500 to transmit the data used for authentication with the external electronic device 600 through the second communication scheme 320.

Figure 13:
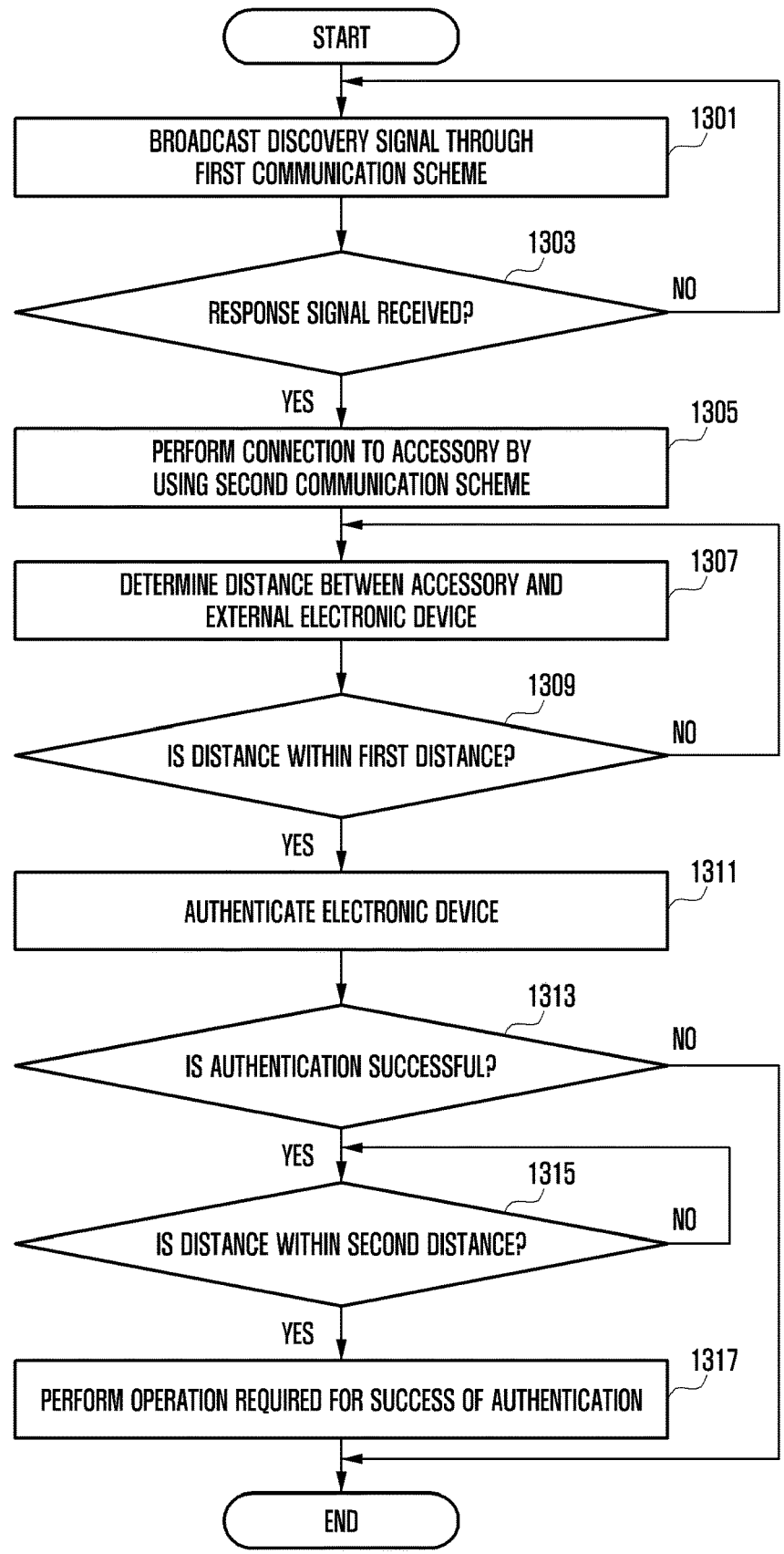
FIG. 13 is an operation flowchart illustrating an operation method of an external electronic device according to various embodiments of the disclosure.

FIG. 13 is an operation flowchart illustrating an operation method of an external electronic device according to various embodiments of the disclosure.

Referring to FIG. 13, in operation 1301, an external electronic device (e.g., the external electronic device 600 in FIG. 3) may broadcast a discovery signal by using a first communication scheme (e.g., the first communication scheme 310 in FIG. 3).

According to various embodiments of the disclosure, the discovery signal may include a signal requesting that a connection to the external electronic device 600 be made through the second communication scheme 320. The discovery signal may be broadcast using the first communication scheme 310 having a signal arrival range that is wider than the maximum signal arrival range of the third communication scheme 330.

According to various embodiments of the disclosure, the discovery signal may include service information that can be provided by the external electronic device 600. The service information may include service identification information, a service category, or a condition in which switching to an accessory mode is not to be performed.

According to various embodiments of the disclosure, in operation 1303, the external electronic device 600 may determine whether a response signal corresponding to the discovery signal has been received.

According to various embodiments of the disclosure, the electronic device 400 may receive the discovery signal transmitted by the external electronic device 600, and may transmit a response signal corresponding to the discovery signal to the external electronic device 600. The external electronic device 600 may receive the response signal through the first communication scheme 310. When the response signal is not received, the external electronic device 600 may continuously broadcast a discovery signal.

According to various embodiments of the disclosure, in operation 1305, the external electronic device 600 may be connected to an accessory (e.g., the accessory 500 in FIG. 3) through a second communication scheme (e.g., the second communication scheme 320 in FIG. 3).

According to various embodiments of the disclosure, the external electronic device 600 may control the second communication module 620 to be connected to the accessory 500 through the second communication scheme 320 in response to receiving the response signal. The response signal may include information (an identifier of the accessory 500) about the accessory 500 electrically connected to the electronic device 400. The external electronic device 600 may determine, based on the identifier of the accessory 500, whether an electronic device connected using the second communication scheme 320 is the accessory 500 operatively connected to the electronic device 400. When the identifier included in the response signal is identical to the identifier of the electronic device connected using the second communication scheme 320, the external electronic device 600 may determine that the accessory 500 connected using the second communication scheme 320 is a device operatively connected to the electronic device 400, may be connected to the accessory 500 through the second communication scheme 320, and may transmit/receive data to/from the accessory 500.

According to various embodiments of the disclosure, in operation 1307, the external electronic device 600 may determine the distance between the accessory 500 and the external electronic device 600.

According to various embodiments of the disclosure, the external electronic device 600 may transmit/receive a polling message, a response message, or a final message to/from the accessory 500 through second communication scheme 320. The external electronic device 600 may determine, based on the transmitted/received message, position information of the electronic device 400 operatively connected to the accessory 500.

According to various embodiments of the disclosure, in operation 1309, the external electronic device 600 may determine whether the distance between the accessory 500 and the external electronic device 600 is within a first distance. The external electronic device 600 may repeat operation 1309 in response to determining that the distance between the accessory 500 and the external electronic device 600 is not within the first distance.

According to various embodiments of the disclosure, in operation 1311, the external electronic device 600 may perform authentication with the electronic device 400 in response to determining that the distance between the accessory 500 and the external electronic device 600 is within a first distance.

According to various embodiments of the disclosure, the external electronic device 600 may receive data for authentication from the electronic device 400 via the accessory 500 through the second communication scheme 320. The external electronic device 600 may authenticate the electronic device 400 by using the data for authentication. The authentication of the electronic device 400 may be a procedure of determining whether the electronic device 400 has a valid right to perform various functions that can be provided by the external electronic device 600. When the distance between the electronic device 400 and the external electronic device 600 is within the first distance, the external electronic device 600 may authenticate the electronic device 400 to prevent a relay attack.

According to various embodiments of the disclosure, in operation 1313, the external electronic device 600 may determine whether authentication of the electronic device 400 is successful.

According to various embodiments of the disclosure, in operation 1315, in response to determining that the authentication of the electronic device 400 is successful, the external electronic device 600 may determine whether the distance between the accessory 500 and the external electronic device 600 is within a second distance. The external electronic device 600 may continuously determine the distance between the accessory 500 and the external electronic device 600 in response to determining that the distance between the accessory 500 and the external electronic device 600 is not within the second distance.

According to various embodiments of the disclosure, the second distance may be shorter than the first distance.

According to various embodiments of the disclosure, the external electronic device 600 may continuously determine the distance between the accessory 500 and the external electronic device 600, and may terminate the connection using the second communication scheme 320 in response to determining that the distance between the accessory 500 and the external electronic device 600 is longer than the first distance.

According to various embodiments of the disclosure, in operation 1317, the external electronic device 600 may perform an operation required for the success of authentication in response to determining that the distance between the accessory 500 and the external electronic device 600 is within the second distance.

According to various embodiments of the disclosure, the external electronic device 600 may be a vehicle, and when the accessory 500 is positioned within a predetermined distance, the external electronic device 600 may perform an operation of opening and closing a door of the vehicle.

Figure 14:
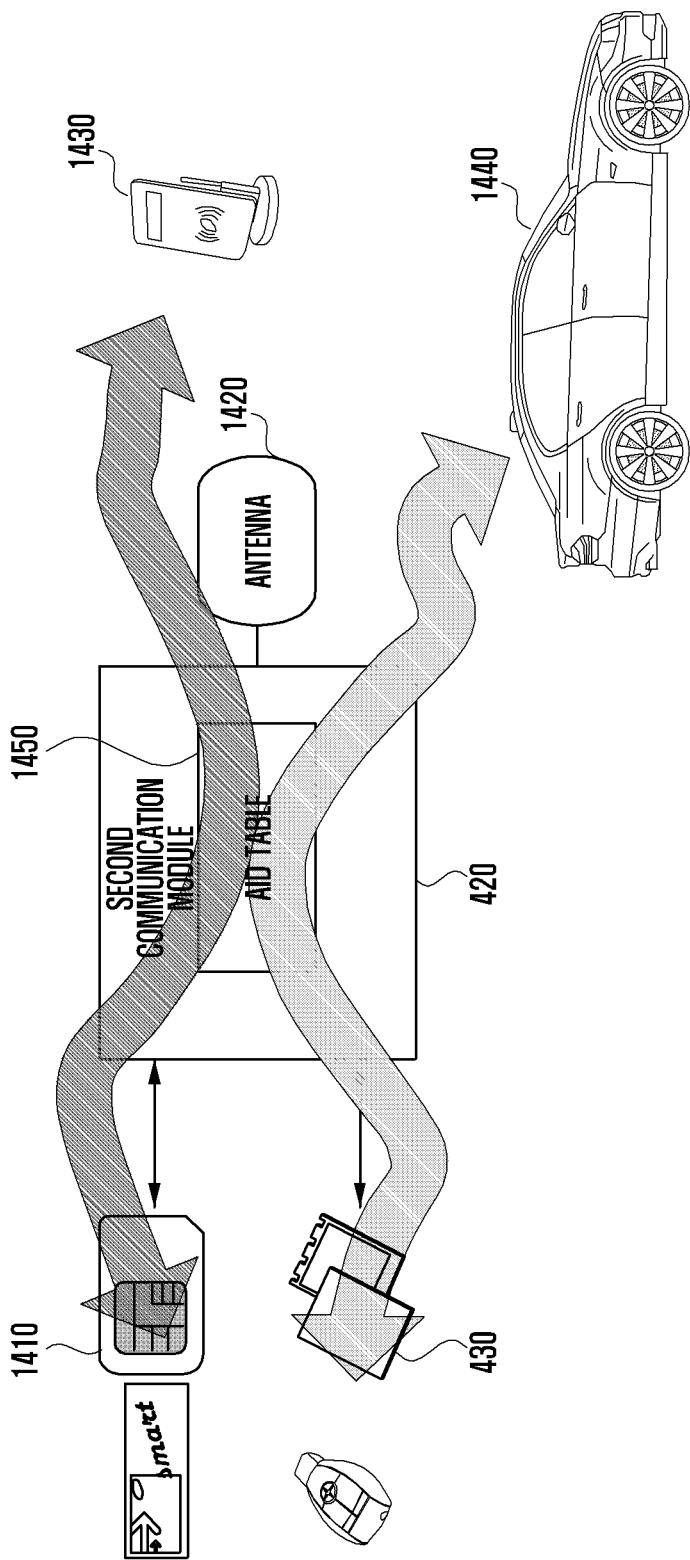
FIG. 14 illustrates an electronic device and an external electronic device according to various embodiments of the disclosure.

FIG. 14 illustrates an electronic device and an external electronic device according to various embodiments of the disclosure.

An external electronic device (e.g., the external electronic device 600 in FIG. 3) according to various embodiments of the disclosure may be not only a vehicle but may also be any electronic device that performs an operation related to authentication of the electronic device 400. Referring to FIG. 14, the external electronic device may be a vehicle 1440 or an electronic device 1430 which performs payment based on the result of authentication of the electronic device 400.

According to various embodiments of the disclosure, each of multiple external electronic devices 1430 and 1440 may transmit/receive data to/from the electronic device 400, and may perform, using the transmitted/received data, authentication of the electronic device 400 and an operation related to authentication of the electronic device 400. To this end, the electronic device 400 may store multiple applications related to authentication (e.g., applications for performing various operations including the opening and closing a door of a vehicle when the external electronic device is a vehicle, or applications for performing payment when the external electronic device is a device configured to perform payment). The second communication module 420 of the electronic device 400 may store an AID table in which multiple application identifiers (AIDs) are mapped to addresses of security modules (e.g., the security module 430 in FIG. 4A) respectively corresponding to the multiple AIDs.

Referring to FIG. 14, an address of a subscriber identification module 1410 (e.g., the subscriber identification module 196 in FIG. 1), which is a smartcard used in the state of being inserted in the electronic device 400, and an identifier of a payment application may be mapped to each other and then stored in an AID table 1450. An identifier of an application installed in the security module 430 of the electronic device 400 and an identifier of a vehicle authentication application may be mapped to each other and stored in the AID table 1450.

According to various embodiments of the disclosure, the electronic device 400 may sense the external electronic device 1430, and may identify, based on the AID table 1450, an application (e.g., a payment application) used for authentication with the external electronic device 1430. The electronic device 400 may perform authentication with the external electronic device 1430 by using the application used for authentication with the external electronic device 1430.

According to various embodiments of the disclosure, the electronic device 400 may transmit/receive data to/from the external electronic devices 1430 and 1440 through an antenna 1420 electrically connected to the second communication module 420. The electronic device 400 may sense the external electronic device 1440, and may identify, based on the AID table 1450, an application (e.g., a vehicle authentication application) used for authentication with the external electronic device 1430. The electronic device 400 may perform authentication with the external electronic device 1440 by using the application used for authentication with the external electronic device 1440.

An operation method of an electronic device according to various embodiments of the disclosure may include: receiving a discovery signal, broadcast by an external electronic device, through a first communication scheme; controlling an accessory, operatively connected to the electronic device, such that the accessory is connected the external electronic device through a second communication scheme in response to receiving the discovery signal; transmitting data used for authentication with the external electronic device to the accessory through a third communication scheme; and transmitting, by the accessory, the data to the external electronic device through the second communication scheme.

In the operation method of the electronic device according to various embodiments of the disclosure, the controlling of the accessory may include switching to an accessory mode in which the electronic device transmits power to the accessory through the third communication scheme and receives data from the accessory through the third communication scheme.

In the operation method of the electronic device according to various embodiments of the disclosure, the controlling of the accessory may include: authenticating the accessory; and determining, based on the result of the authentication, whether to switch to the accessory mode.

In the operation method of the electronic device according to various embodiments of the disclosure, the second communication scheme may include a UWB communication scheme, and the third communication scheme may be an NEC scheme.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. A vehicle comprising:
a first communication circuit configured to communicate with a smartphone using a first communication scheme;
a second communication circuit configured to communicate, using a second communication scheme, with an accessory; and
a processor operatively connected to the first communication circuit and the second communication circuit,
wherein the processor is configured to:
control the first communication circuit to broadcast, using the first communication scheme, a discovery signal for searching for the smartphone, wherein the discovery signal comprises a signal requesting a connection to the smartphone;
receive a response signal corresponding to the discovery signal through the first communication scheme, the response signal including an identifier from the smartphone;
determine whether to connect the accessory through the second communication scheme based on whether the identifier from the smartphone included in the response signal is identical with an identifier received from the accessory through the second communication scheme;
control the second communication circuit to be connected to the accessory through the second communication scheme based on the determination;
determine a distance between the accessory and the vehicle, based on a signal comprising data which is transmitted by the accessory through the second communication scheme and is used to authenticate the smartphone;
authenticate, based on the data, the smartphone in response to determining that the distance between the accessory and the vehicle is within a first distance; and
perform an operation related to the authentication when the distance between the accessory and the vehicle is within a second distance and the authentication is completed.

2. The vehicle of claim 1, wherein the processor is configured to control the second communication circuit to transmit the distance between the accessory and the vehicle to the accessory through the second communication scheme.

3. The vehicle of claim 1, wherein the second distance is shorter than the first distance.

4. The vehicle of claim 1, wherein the processor is configured to transmit, through one of the first communication scheme or the second communication scheme, a signal requesting termination of the connection using the second communication scheme.

* * * * *